(12) United States Patent
Tabata et al.

(10) Patent No.: US 7,426,972 B2
(45) Date of Patent: Sep. 23, 2008

(54) CONTROL DEVICE FOR VEHICULAR DRIVE SYSTEM

(75) Inventors: Atsushi Tabata, Okazaki (JP); Yutaka Taga, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 416 days.

(21) Appl. No.: 11/172,988

(22) Filed: Jul. 5, 2005

(65) Prior Publication Data

US 2006/0027413 A1    Feb. 9, 2006

(30) Foreign Application Priority Data

Aug. 5, 2004    (JP)    ............... 2004-229913

(51) Int. Cl.
*B60K 1/00*    (2006.01)
*B60K 6/00*    (2007.10)

(52) U.S. Cl. .................. 180/65.2; 180/65.3; 180/65.4; 903/909; 903/910; 903/911; 903/915; 903/916; 903/917; 903/918; 903/941; 903/945

(58) Field of Classification Search ............... 180/65.2, 180/65.3, 65.4; 903/909–911, 915–918, 903/941, 945
See application file for complete search history.

(56) References Cited

U.S. PATENT DOCUMENTS

| 6,579,201 | B2* | 6/2003 | Bowen | ...................... 475/5 |
| 6,988,572 | B2* | 1/2006 | Tatara et al. | ............. 180/65.2 |
| 2002/0045507 | A1 | 4/2002 | Bowen | |
| 2002/0063000 | A1* | 5/2002 | Kojima | ................ 180/65.1 |
| 2003/0078126 | A1* | 4/2003 | Holmes et al. | ............. 475/5 |

FOREIGN PATENT DOCUMENTS

| JP | 10-306739 A | 11/1998 |
| JP | 11-217025 | 8/1999 |
| JP | 2000-002327 A | 1/2000 |
| JP | 2000-209706 A | 7/2000 |
| JP | 2000-346187 A | 12/2000 |
| JP | 2004-236406 A | 8/2004 |

OTHER PUBLICATIONS

English Language Version of German Office Action, Appln. No. 10 2005 036 518.3-32, issued Jun. 5, 2007.

\* cited by examiner

*Primary Examiner*—Christopher P. Ellis
*Assistant Examiner*—John R. Olszewski
(74) *Attorney, Agent, or Firm*—Kenyon & Kenyon LLP

(57) ABSTRACT

A control device for a vehicular drive system including (a) a differential mechanism operable to distribute an output of an engine (8) to a first electric motor and a power transmitting member, (b) a second electric motor disposed in a power transmitting path between the power transmitting member and a drive wheel of a vehicle, and (c) a differential-state switching device operable to place the differential mechanism selectively in one of a differential state in which the differential mechanism is operable to perform a differential function and a locked state in which the differential mechanism is not operable to perform the differential function, the control device including an engine-stop switching control portion operable to control the differential-state switching device to place the differential mechanism in the differential state, upon stopping of the engine, so that the engine speed can be rapidly lowered to zero by controlling the first electric motor in the differential state of the differential mechanism, so as to reduce a possibility of occurrence of a resonance phenomenon of the drive system and a resultant vibration of the vehicle when the engine is stopped.

13 Claims, 14 Drawing Sheets

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | |
| 2nd | ◎ | ○ | | | | ○ | | 2.180 | 1.54 |
| 3rd | ◎ | ○ | | | ○ | | | 1.424 | 1.53 |
| 4th | ◎ | ○ | ○ | | | | | 1.000 | 1.42 |
| 5th | | ○ | ○ | ◎ | | | | 0.705 | 1.42 |
| R | | | ○ | | | | ○ | 3.209 | SPREAD 4.76 |
| N | ○ | | | | | | | | |

○ ENGAGED
◎ ENGAGED FOR STEP-VARIABLE SHIFTING, AND RELEASED FOR CONTINUOUSLY-VARIABLE SHIFTING

|  | C0 | C1 | C2 | B0 | B1 | B2 | SPEED RATIO | STEPPING RATIO |
|---|---|---|---|---|---|---|---|---|
| 1st | ◎ | ○ |  |  |  | ○ | 2.804 | 1.54 |
| 2nd | ◎ | ○ |  |  | ○ |  | 1.531 | 1.53 |
| 3rd | ◎ | ○ | ○ |  |  |  | 1.000 | 1.42 |
| 4th |  | ○ | ○ | ◎ |  |  | 0.705 | SPREAD 3.977 |
| R |  |  | ○ |  |  | ○ | 2.393 |  |
| N |  | ○ |  |  |  |  |  |  |

○ ENGAGED
◎ ENGAGED FOR STEP-VARIABLE SHIFTING, AND RELEASED FOR CONTINUOUSLY VARIABLE SHIFTING

CONTROL DEVICE FOR VEHICULAR DRIVE SYSTEM

The present application is based on Japanese Patent Application No. 2004-229913 filed on Aug. 5, 2004, the content of which is incorporated herein by reference.

BACKGROUND OF THE INVENTION

1. Field of the Invention

The present invention relates in general to a control device for a vehicular drive system including an engine and a differential mechanism which functions as an electrically controlled differential device having a differential function, and more particularly to techniques for controlling the vehicular drive system upon stopping of the engine.

2. Description of Related Art

There is known a drive system for a vehicle, which includes a differential mechanism arranged to distribute an output of an engine to a first electric motor and an output shaft, and a second electric motor disposed between the output shaft of the differential mechanism and drive wheels of the vehicle. Examples of this type of vehicular drive system include drive systems for a hybrid vehicle as disclosed in JP-10-306739A, JP-2000-346187A and JP-2000-2327A, typically in JP-10-306739A. In these hybrid vehicle drive systems, the differential mechanism is constituted by a planetary gear set, for example, and a major portion of the drive force generated by the engine is mechanically transmitted to the drive wheels through the differential function of the differential mechanism, while the rest of the drive force is electrically transmitted from the first electric motor to the second electric motor, through an electric path therebetween, so that the differential mechanism functions as a transmission such as an electrically controlled continuously variable transmission the speed ratio of which is electrically variable, thereby making it possible to drive the vehicle under the control of a control device, with the engine kept in an optimum operating state with an improved fuel economy.

A continuously variable transmission is generally known as a power transmitting mechanism suitable for improving the fuel economy of a vehicle, while on the other hand a gear type transmission device such as a step-variable automatic transmission is known as a power transmitting mechanism suitable for improving the power transmitting efficiency. However, there is not known any power transmitting mechanism that is suitable for improving both of the fuel economy and the power transmitting efficiency. The hybrid vehicle drive system disclosed in JP-10-306739A, for example, has an electric path through which an electric energy is transmitted from the first electric motor to the second electric motor, that is, a power transmitting path through which a portion of the vehicle drive force which has been converted from a mechanical energy into an electric energy is transmitted. This drive system requires the first electric motor to be large-sized with an increase of the required output of the engine, so that the second electric motor operated with the electric energy supplied from the first electric motor is also required to be large-sized, whereby the drive system tends to be unfavorably large-sized. The same drive system also suffers from a risk of deterioration of the fuel economy during a high-speed running of the vehicle, for example, due to conversion of a portion of the mechanical energy produced by the engine into an electric energy, which is subsequently converted into a mechanical energy to be transmitted to the drive wheels of the vehicle. A similar problem is encountered in a vehicular drive system wherein the differential mechanism is used as a transmission the speed ratio of which is electrically variable, for instance, as a continuously variable transmission which is a so-called "electrically controlled CVT".

A vehicle is generally subject to various kinds of vibration. An engine of the vehicle, which is one of vibration sources, has a variation of its torque during its operation, which causes torsional vibration of a power transmitting system (vehicular drive system), which is amplified by a resonance phenomenon and transmitted to the body of the vehicle through a damping device such as engine mounts. As well known in the art, the resonance phenomenon may take place in a specific speed range of the engine called "resonance speed range", for example, a speed range the upper limit of which is not higher than an idling speed of the engine. When a condition for stopping an operation of the engine is satisfied, a fuel supply to the engine is stopped so that the engine speed is lowered to zero. In this process of lowering of the engine speed upon stopping of the engine, the engine speed falls into the resonance speed range in which the resonance phenomenon may takes place. In the hybrid vehicle drive system as disclosed in JP-10-306739A, the first electric motor is operated to lower the engine speed to zero at a high rate through the resonance speed range, for thereby reducing the risk of occurrence of the resonance phenomenon.

It is desirable to further reduce the risk of occurrence of the resonance phenomenon upon stopping of the engine even in the hybrid vehicle drive system arranged to reduce the risk in the manner described above.

SUMMARY OF THE INVENTION

The present invention was made in view of the background art described above. It is therefore an object of the present invention to provide a control device for a vehicular drive system, which permits further reduction of the resonance phenomenon upon stopping of the engine, as well as enables the vehicular drive system to be small-sized and/or permits an improvement of the fuel economy of the vehicle.

The object indicated above may be achieved according to any one of the following modes of the invention, each of which is numbered like the appended claims and depends from the other mode or modes, where appropriate, for easier understanding of technical features disclosed in the present application and possible combinations of those features. It is to be understood that the present invention is not limited to those technical features or combinations thereof.

(1) A control device for a vehicular drive system including (a) a differential mechanism operable to distribute an output of an engine to a first electric motor and a power transmitting member, (b) a second electric motor disposed in a power transmitting path between the power transmitting member and a drive wheel of a vehicle, and (c) a differential-state switching device operable to place the differential mechanism selectively in one of a differential state in which the differential mechanism is operable to perform a differential function and a locked state in which the differential mechanism is not operable to perform the differential function, the control device comprising an engine-stop switching control portion operable to control the differential-state switching device to place the differential mechanism in the differential state, when the engine is stopped.

In the control device according to the above-described mode (1) of this invention, the differential mechanism is switched by the differential-state switching device, so as to be placed selectively in the differential state in which the differential mechanism is operable to perform a differential function, and the locked state in which the differential mechanism is not operable to perform the differential function. Therefore, the present control device has not only an advantage of an improvement in the fuel economy owing to a function of a transmission whose speed ratio is electrically variable, but also an advantage of high power transmitting efficiency owing to a function of a gear type transmission capable of mechanically transmitting a vehicle drive force. Accordingly, when the engine is in a normal output state with a relatively low or medium output while the vehicle is running at a relatively low or medium running speed, the differential mechanism is placed in the differential state, assuring a high degree of fuel economy of the vehicle. When the vehicle is running at a relatively high speed, on the other hand, the differential mechanism is placed in the locked state in which the output of the engine is transmitted to the drive wheel primarily through a mechanical power transmitting path, so that the fuel economy is improved owing to reduction of a loss of conversion of a mechanical energy into an electric energy, which loss would take place when the differential mechanism is operated as the transmission whose speed ratio is electrically variable. When the engine is in a high-output state, the differential mechanism is also placed in the locked state. Therefore, the differential mechanism is operated as the transmission whose speed ratio is electrically variable, only when the vehicle speed is relatively low or medium or when the engine output is relatively low or medium, so that the required amount of electric energy generated by the electric motor that is, the maximum amount of electric energy that must be transmitted from the electric motor can be reduced, making it possible to minimize the required sizes of the electric motor, and the required size of the drive system including the electric motor.

When the engine is stopped in the vehicular drive system including the differential mechanism switchable between the differential state and the locked state, the engine-stop switching control portion places the differential mechanism in the differential state, so that the differential mechanism is held in a freely rotatable state in which the engine speed is not influenced or governed by the rotating speed of the power transmitting member, which is an output member of the differential mechanism. Accordingly, the rate at which the engine speed is lowered upon stopping of the engine can be controlled by controlling the first electric motor while the differential mechanism is placed in the differential state, whereby the engine can be smoothly stopped.

(2) The control device according to the above-described mode (1), wherein the vehicular drive system comprises a continuously-variable transmission portion including the differential mechanism, the second electric motor and the differential-state switching device, and further comprises an automatic transmission portion which constitutes a part of the power transmitting path and which functions as an automatic transmission, and wherein the differential-state switching device is operable to switch the differential mechanism between the differential and locked state, for placing the continuously-variable transmission portion selectively in one of a continuously-variable shifting state in which the continuously-variable transmission portion is operable as an electrically controlled continuously variable transmission, and a step-variable shifting state in which the continuously-variable transmission portion is not operable as the electrically controlled continuously variable transmission.

(3) The control device according to the above-described mode (1) or (2), wherein the engine-stop switching control portion is operable to place the differential-state switching device in a released state to place the differential mechanism in the differential state, when the engine is stopped.

When the engine is stopped in the vehicular drive system including the continuously-variable transmission portion switchable between the continuously-variable and step-variable shifting states, the differential-state switching device is released by the engine-stop switching control portion, so that the differential mechanism is held in a freely rotatable state in which the engine speed is not influenced or governed by the rotating speed of the power transmitting member which functions as the output member of the continuously-variable transmission portion. Accordingly, the engine speed can be suitably controlled so as to reduce a vibration of the vehicle upon stopping of the engine.

(4) The control device according to any one of the above-described modes (1)-(3), further comprising an engine-stop control portion operable to control a rate of lowering of a speed of the engine upon stopping of the engine, by controlling the first electric motor while the differential mechanism is placed in the differential state.

The engine-stop control portion provided in the control device according to the above mode (4) permits the engine speed to be lowered at a suitably controlled rate by controlling the first electric motor, so as to reduce a possibility of occurrence of a resonance phenomenon of the vehicular drive system upon stopping of the vehicle, and prevent or reduce a possibility of occurrence of a so-called "undershoot" phenomenon in which the engine speed is lowered below zero, namely, the engine is rotated in the reverse direction after the engine speed is zeroed.

(5) The control device according to the above-described mode (4), wherein the engine-stop control portion is operable to lower a speed of the first electric motor for rapidly lowering the speed of the engine to zero through a predetermined resonance speed range in which a resonance phenomenon of the vehicular drive system that causes a vibration of the vehicle a level of which is higher than an upper limit would otherwise be expected to take place.

In the control device including the engine-stop control portion according to the above-described mode (5), the engine speed can be rapidly lowered to zero through the predetermined resonance speed range by lowering the speed of the first electric motor, making it possible to reduce the possibility of occurrence of the resonance phenomenon that would cause the vehicle vibration the level of which is higher than the upper limit, if the engine speed were not rapidly lowered through the resonance speed range.

(6) The control device according to any one of the above-described modes (1)-(5), wherein the differential-state switching device includes a coupling device operable to place the power transmitting path selectively in one of a power-transmitting state and a power-cut-off state, and a shifting device manually operable to a driving position in which the power transmitting path is placed in the power-transmitting state, and a non-driving state in which the power transmitting path is placed in the power-cut-off state, and wherein the engine-stop control portion is operable to place the differential mechanism in the differential state when the shifting device is placed in the driving state.

In the control device according to the above-described mode (6), the differential mechanism is placed into the differential state by the engine-stop control portion, if the engine is stopped while the shifting device is placed in the driving position in which the rotating speed of the power transmitting member which is the output member of the differential mechanism is influenced or governed by the vehicle speed. Accordingly, the engine speed can be suitably controlled by controlling the first electric motor upon stopping of the engine.

(7) The control device according to any one of the above-described modes (1)-(6), wherein the differential mechanism includes a first element fixed to the engine, a second element fixed to the fist electric motor, and a third element fixed to the power distributing member, and the differential-state switching device is operable to permit the first, second and third elements to be rotated relative to each other, for thereby placing the differential mechanism in the differential state, and to connect the first, second and third elements for rotation as a unit or to hold the second element stationary, for thereby placing the differential mechanism in the locked state.

In the above-described mode (7), the differential mechanism can be suitably switched by the differential-state switching device, between the differential and locked states.

(8) The control device according to the above described mode (7), wherein the differential-state switching device includes a clutch operable to connect at least two of the first, second and third elements to each other for rotation of the first, second and third elements as a unit, and/or a brake operable to fix the second element to a stationary member for holding the second element stationary.

In the above-described mode (8), the differential mechanism can be suitably switched by the differential-state switching device, between the differential and locked states.

(9) The control device according to the above-described mode (8), wherein the differential-state switching device includes both of the clutch and the brake, and is operable to release the clutch and the brake for thereby placing the differential mechanism in the differential state in which the first, second and third elements are rotatable relative to each other, and to engage the clutch and release the brake for thereby enabling the differential mechanism to function as a transmission having a speed ratio of 1, or engage the brake and release the clutch for thereby enabling the differential mechanism to function as a speed-increasing transmission having a speed ratio lower than 1.

In the above-described mode (9), the differential mechanism can be suitably switched by the differential-state switching device, between the differential and locked states, and is operable as a transmission having a single fixed speed ratio or a plurality of speed ratios.

(10) The control device according to any one of the above-described modes (7)-(9), wherein the differential mechanism is a planetary gear set, and the first, second and third elements are respective a carrier, a sun gear and a ring gear of the planetary gear set.

In the above-described mode (10), the axial dimension of the differential mechanism can be reduced, and the differential mechanism can be simply constituted by one planetary gear set.

(11) The control device according to the above-described mode (10), wherein the planetary gear set is of a single-pinion type.

In the above-described mode (11), the axial dimension of the differential mechanism can be reduced, and the differential mechanism can be simply constituted by one planetary gear set of a single-pinion type.

(12) The control device according to any one of the above-described modes (1)-(11), wherein the vehicular drive system further includes an automatic transmission portion disposed between the power transmitting member and the drive wheel, and has an overall speed ratio which is determined by a speed ratio of the differential mechanism and a speed ratio of the automatic transmission portion.

In the above-described mode (12), the speed ratio of the automatic transmission portion can be effectively utilized, so that the vehicle drive force can be obtained over a relatively wide range of the speed ratio of the drive system, whereby the operating efficiency of the differential mechanism (or continuously-variable transmission portion) operable as the electrically controlled continuously variable transmission can be improved.

(13) The control device according to the above-described mode (12), wherein the automatic transmission portion is a step-variable automatic transmission.

In the above-described mode (13), a continuously variable transmission is constituted by the step-variable automatic transmission and the differential mechanism placed in its differential state, while a step-variable transmission is constituted by the step-variable automatic transmission and the differential mechanism placed in its locked state.

BRIEF DESCRIPTION OF THE DRAWINGS

The above and other objects, features, advantages and technical and industrial significance of this invention will be better understood from the following detailed description of preferred embodiments of the invention, when considered in connection with the accompanying drawings in which.

DETAILED DESCRIPTION OF THE PREFERRED EMBODIMENTS

Figures 1, 2:
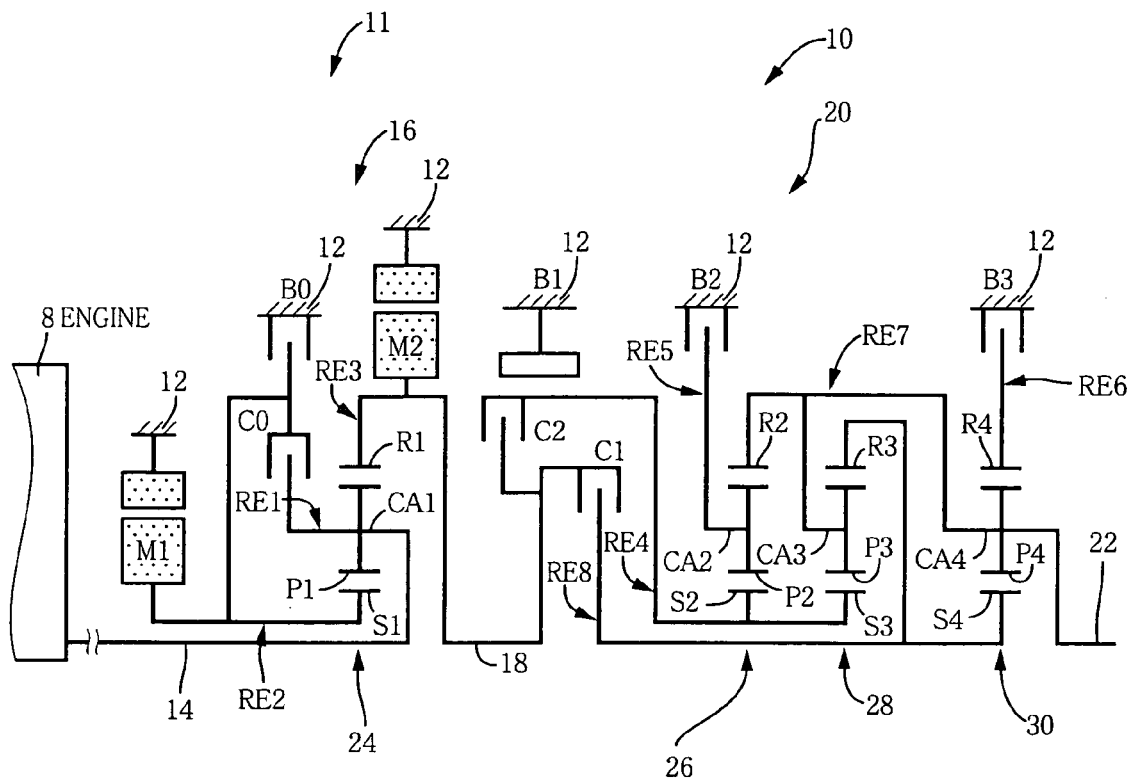
FIG. 1 is a schematic view showing one example of an arrangement of a transmission mechanism of a drive system for a hybrid vehicle, which is controlled by an electronic control device according to one embodiment of the present invention.
FIG. 2 is a table indicating shifting actions of the transmission mechanism of the vehicular drive system of FIG. 1, which is operable in a selected one of a continuously-variable shifting state and a step-variable shifting state, in relation to different combinations of operating states of hydraulically operated frictional coupling devices to effect the respective shifting actions.

Referring to the drawings, there will be described in detail the preferred embodiment of the present invention.

Figure 5:
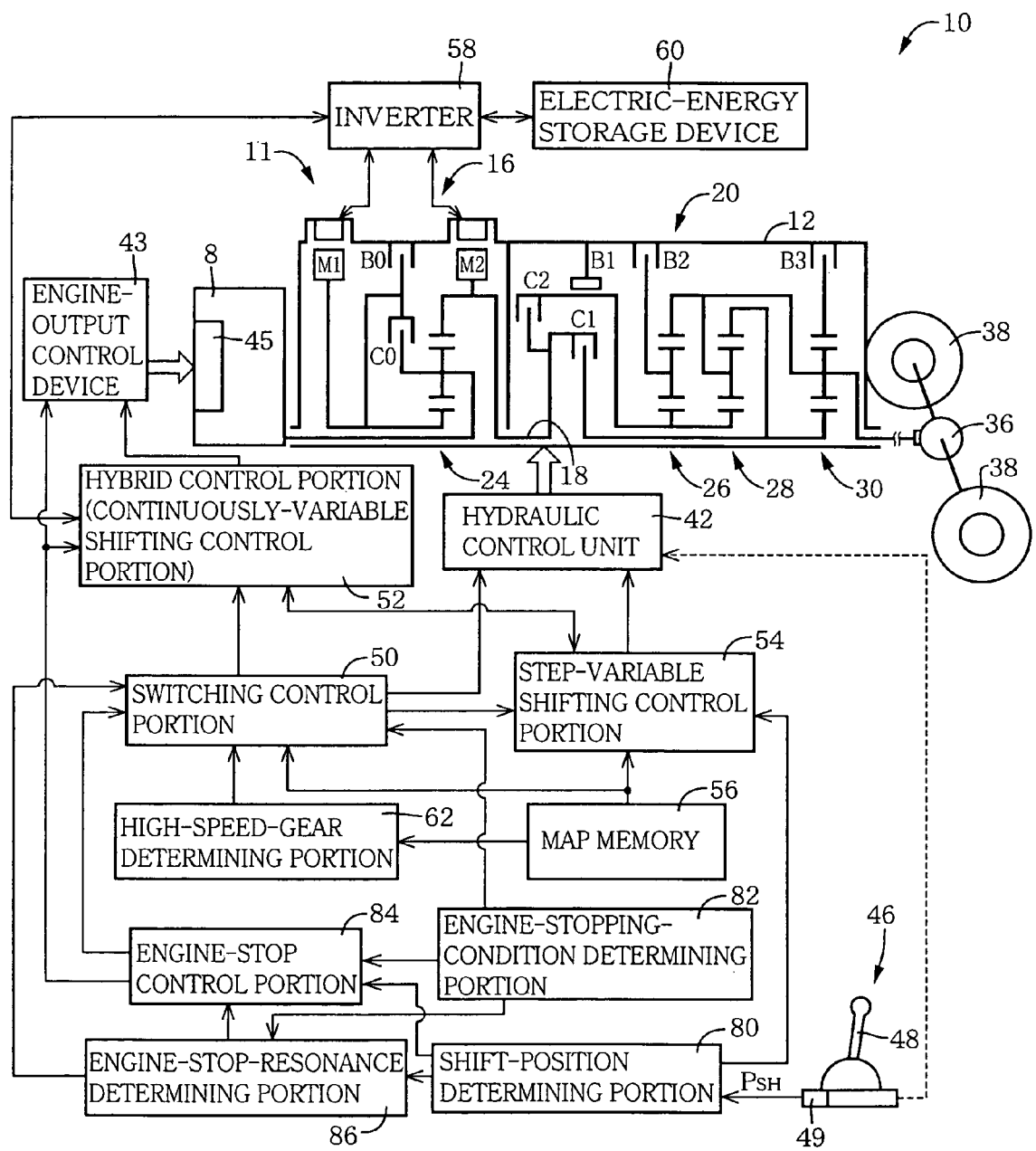
FIG. 5 is a functional block diagram illustrating major control functions performed by the electronic control device of FIG. 4.

Reference is first made to the schematic view of FIG. 1 explaining a transmission mechanism 10 constituting a part of a drive system for a hybrid vehicle, which drive system is controlled by a control device according to one embodiment of this invention. The transmission mechanism 10 includes: an input rotary member in the form of an input shaft 14 disposed on a common axis in a transmission casing 12 functioning as a stationary member attached to a body of the vehicle; a continuously-variable transmission portion 11 connected to the input shaft 14 either directly, or indirectly via a pulsation absorbing damper (vibration damping device) not shown; a step-variable or multiple-step automatic transmission portion 20 interposed between and connected in series via a power transmitting member 18 (power transmitting shaft) to the continuously-variable transmission portion 11 and drive wheels 38 (shown in FIG. 5) of the vehicle; and an output rotary member in the form of an output shaft 22 connected to the automatic transmission portion 20. The input shaft 12, continuously-variable transmission portion 11, automatic transmission portion 20 and output shaft 22 are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed reduction gear) and a pair of drive axles, as shown in FIG. 5. The engine 8 may be a gasoline engine or diesel engine and functions as a vehicle drive power source directly connected to the input shaft 14 or indirectly via a pulsation absorbing damper. It is noted that a lower half of the transmission mechanism 10, which is constructed symmetrically with respect to its axis, is omitted in FIG. 1. This is also true in the other embodiments described below. In the present transmission mechanism 10, the engine 8 and the continuously-variable transmission portion 11 are connected to each other directly or indirectly through the pulsation absorbing damper, as described above, but a fluid-operated power transmitting device such as a torque converter or fluid coupling is not interposed between the engine 8 and the transmission portion 11.

The continuously-variable transmission portion 11 includes: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 the output shaft of which is rotated with the power transmitting member 18. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio ρ1 of about 0.418, for example, a switching clutch C0 and a switching brake B1. The first planetary gear set 24 has rotary elements consisting of a first sun gear S1, a first planetary gear P1; a first carrier CA1 supporting the first planetary gear P1 such that the first planetary gear P1 is rotatable about its axis and about the axis of the first sun gear. S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio ρ1 is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the transmission casing 12, and the switching clutch C0 is disposed between the first sun gear S1 and the first carrier CA1. When the switching clutch C0 and brake B0 are both released, the power distributing mechanism 16 is placed in a differential state in which the first sun gear S1, first carrier CA1 and first ring gear R1 of the first planetary gear set 24 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 16 is placed in the continuously-variable shifting state (electrically established CVT state), in which the rotating speed of the power transmitting member 18 is continuously variable, irrespective of the rotating speed of the engine 8, namely, placed in the differential state in which a speed ratio $\gamma 0$ (rotating speed of the input shaft 14/rotating speed of the power transmitting member 18) of the power distributing mechanism 16 is continuously changed from a minimum value $\gamma 0$ min to a maximum value $\gamma 0$ max, that is, in the continuously-variable shifting state in which the power distributing mechanism 16 functions as an electrically controlled continuously variable transmission the speed ratio $\gamma 0$ of which is continuously variable from the minimum value $\gamma 0$ min to the maximum value $\gamma 0$ max.

When the switching clutch C0 or brake B0 is engaged while the power distributing mechanism 16 is placed in the continuously-variable shifting state, the mechanism 16 is brought into a locked state or non-differential state in which the differential function is not available. Described in detail, when the switching clutch C0 is engaged, the first sun gear S1 and the first carrier CA1 are connected together, so that the power distributing mechanism 16 is placed in the locked state or non-differential state in which the three rotary elements of the first planetary gear set 24 consisting of the first sun gear S1, first carrier CA1 and first ring gear R1 are rotatable as a unit, so that the continuously-variable transmission portion 11 is also placed in a non-differential state. In this non-differential state, the rotating speed of the engine 8 and the rotating speed of the power transmitting member 18 are made equal to each other, so that the power distributing mechanism 16 is placed in a fixed-speed-ratio shifting state or step-variable shifting state in which the mechanism 16 functions as a transmission having a fixed speed ratio $\gamma 0$ equal to 1. When the switching brake B0 is engaged in place of the switching clutch C0, the first sun gear S1 is fixed to the transmission casing 12, so that the power distributing mechanism 16 is placed in the locked or non-differential state in which the first sun gear S1 is not rotatable. Since the rotating speed of the first ring gear R1 is made higher than that of the first carrier CA1, the continuously-variable transmission portion 11 is placed in the fixed-speed-ratio shifting state or step-variable shifting state in which the mechanism 16 functions as a speed-increasing transmission having a fixed speed ratio $\gamma 0$ smaller than 1, for example, about 0.7. Thus, the frictional coupling devices in the form of the switching clutch C0 and brake B0 function as a differential-state switching device operable to selectively place the continuously-variable transmission portion 11 selectively in the continuously-variable shifting state (differential state) in which the mechanism 16 is operable as an electrically controlled continuously variable transmission the speed ratio of which is continuously variable, and in the locked state or step-variable shifting state in which the mechanism 16 is not operable as the electrically controlled continuously variable transmission, namely, in the fixed-speed-ratio shifting state (non-differential state) in which the mechanism 16 functions as a transmission having a single gear position with one speed ratio or a plurality of gear positions with respective speed ratios.

The automatic transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio $\rho 2$ of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio $\rho 3$ of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio $\rho 4$ of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios $\rho 2$, $\rho 3$ and $\rho 4$ are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the transmission casing 12 through a first brake B1. The second carrier CA2 is selectively fixed to the transmission casing 12 through a second brake B2, and the fourth ring gear R4 is selectively fixed to the transmission casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1. Thus, the automatic transmission portion 20 and the power transmitting member 18 are selectively connected to each other through the first clutch C1 or second clutch C2, which is used to establish gear positions of the automatic transmission portion 20. In other words, the first and second clutches C1, C2 cooperate to function as coupling devices operable to switch a power transmitting path connecting the power transmitting member 18 and the automatic transmission 20 (connecting the continuously-variable transmission portion 11 (power transmitting member 18) and the drive wheels 38), between a power-transmitting state in which a vehicle drive force can be transmitted through the power transmitting path, and a power-cut-off state in which the vehicle drive force cannot be transmitted through the power transmitting path. That is, the power transmitting path is placed in the power transmitting state when at least one of the first and second clutches C1, C2 is engaged, and is placed in the power-cut-off state when the first and second clutches C1, C2 are both released.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, one of a first gear position (first speed position) through a fifth gear position (fifth speed position), a reverse gear position (rear drive position) and a neural position is selectively established by engaging actions of a corresponding combination of the frictional coupling devices selected from the above-described switching clutch C0, first clutch C1, second clutch C2, switching brake B0, first brake B1, second brake B2 and third brake B3, as indicated in the table of FIG. 2. Those positions have respective speed ratios γ (input shaft speed $N_{IN}$/output shaft speed $N_{OUT}$) which change as geometric series. In particular, it is noted that the power distributing mechanism 16 is provided with the switching clutch C0 and brake B0 so that the continuously-variable transmission portion 11 can be selectively placed by engagement of the switching clutch C0 or switching brake B0, in the fixed-speed-ratio shifting state in which the mechanism 16 is operable as a transmission having a single gear position with one speed ratio or a plurality of gear positions with respective speed ratios, as well as in the continuously-variable shifting state in which the mechanism 16 is operable as a continuously variable transmission, as described above. In the present transmission mechanism 10, therefore, a step-variable transmission is constituted by the automatic transmission portion 20, and the continuously-variable transmission portion 11 which is placed in the fixed-speed-ratio shifting state by engagement of the switching clutch C0 or switching brake B0. Further, a continuously variable transmission is constituted by the automatic transmission portion 20, and the continuously-variable transmission portion 11 which is placed in the continuously-variable shifting state, with none of the switching clutch C0 and brake B0 being engaged. In other words, the transmission mechanism 10 is switched to the step-variable shifting state by engaging one of the switching clutch C0 and switching brake B0, and switched to the continuously-variable shifting state by releasing both of the switching clutch C0 and brake B0. The continuously-variable transmission portion 11 is also considered to be a transmission switchable between the step-variable shifting state and the continuously-variable shifting state.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0.

Where the transmission mechanism 10 functions as the continuously-variable transmission, on the other hand, the switching clutch C0 and the switching brake B0 indicated in FIG. 2 are both released, so that the continuously-variable transmission portion 11 functions as the continuously variable transmission, while the automatic transmission portion 20 connected in series to the continuously-variable transmission portion 111 functions as the step-variable transmission, whereby the speed of the rotary motion transmitted to the automatic transmission portion 20 placed in one of the first through fourth gear positions, namely, the rotating speed of the power transmitting member 18 is continuously changed, so that the speed ratio of the drive system when the automatic transmission portion 20 is placed in one of those gear positions is continuously variable over a predetermined range. Accordingly, the speed ratio of the automatic transmission portion 20 is continuously variable across the adjacent gear positions, whereby the overall speed ratio γT of the transmission mechanism 10 is continuously variable.

Figure 3:
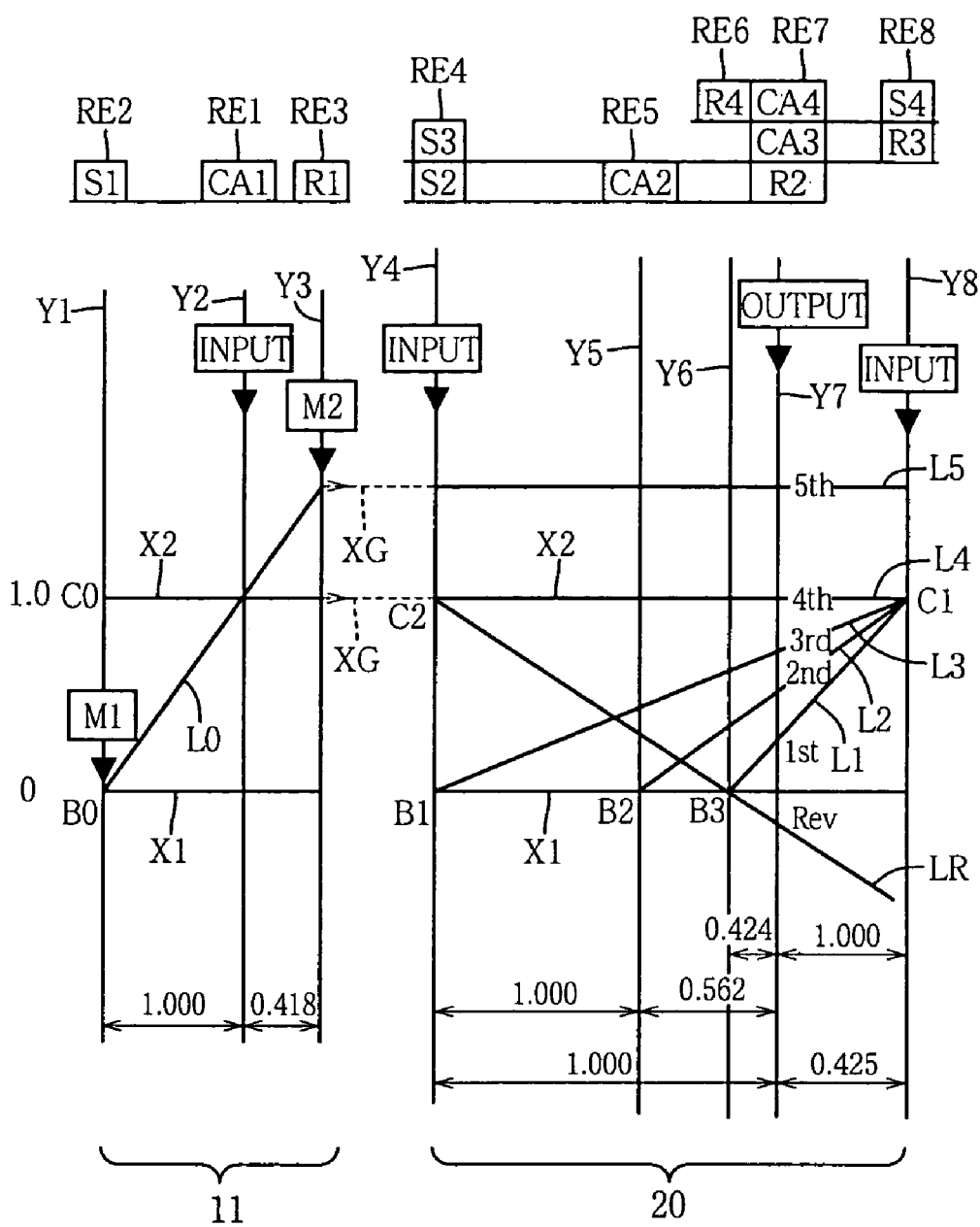
FIG. 3 is a collinear chart indicating relative rotating speeds of rotary elements of the transmission mechanism of the vehicular drive system of the embodiment of FIG. 1 operated in the step-variable shifting state, in different gear positions of the drive system.

The collinear chart of FIG. 3 indicates, by straight lines, a relationship among the rotating speeds of the rotary elements in each of the gear positions of the transmission mechanism 10, which is constituted by the continuously-variable transmission portion 11 functioning as the continuously-variable shifting portion or first shifting portion, and the automatic transmission portion 20 functioning as the step-variable shifting portion or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines X1, X2, XG, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the continuously-variable transmission portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the automatic transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines Y4-Y8 are determined by the gear ratios ρ2, ρ3 and ρ4 of the second, third and fourth planetary gear sets 26, 28, 30. That is, the distances between the sun gear and carrier of each of the second, third and fourth planetary gear sets 26, 28, 30 corresponds to "1", while the distances between the carrier and ring gear of each of those planetary gear sets 26 28, 30 corresponds to the gear ratio ρ.

Referring to the collinear chart of FIG. 3, the power distributing mechanism 11 (continuously-variable transmission portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the transmission casing 12 through the switching brake B0, while the third rotary element RE3 (first ring gear R1) is fixed to the power transmitting member 18 and the second electric motor M2, so that a rotary motion of the input shaft 14 is transmitted to the automatic transmission 20 (step-variable transmission portion) through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state by releasing actions of the switching clutch C0 and brake B0, for instance, the rotating speed of the first sun gear S1 represented by a point of intersection between the line L0 and the vertical line Y1 is raised or lowered by controlling the reaction force generated by an operation of the first electric motor M1 to generate an electric energy, so that the rotating speed of the first ring gear R1 represented by a point of intersection between the line L0 and the vertical line Y3 is lowered or raised. When the switching clutch C0 is engaged, the first sun gear S1 and the first carrier CA1 are connected to each other, and the power distributing mechanism 16 is placed in the non-differential state in which the above-indicated three rotary elements are rotated as a unit, so that the line L0 is aligned with the horizontal line X2, so that the power transmitting member 18 is rotated at a speed equal to the engine speed NE. When the switching brake B0 is engaged, on the other hand, the rotation of the first sun gear S1 is stopped, and the power distributing mechanism 16 is placed in the non-differential state and functions as the speed-increasing mechanism, so that the line L0 is inclined in the state indicated in FIG. 3, whereby the rotating speed of the first ring gear R1, that is, the rotation of the power transmitting member 18 represented by a point of intersection between the lines L0 and Y3 is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the transmission casing 12 through the first brake B1, and the fifth rotary element RE5 is selectively fixed to the transmission casing 12 through the second brake B2, while the sixth rotary element RE6 is selectively fixed to the transmission casing 12 through the third brake B3. The seventh rotary element RE7 is fixed to the output shaft 22, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as shown in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed NE, with the drive force received from the power distributing mechanism 16. When the switching clutch B0 is engaged in place of the switching clutch C0, the eighth rotary element RE8 is rotated at, a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
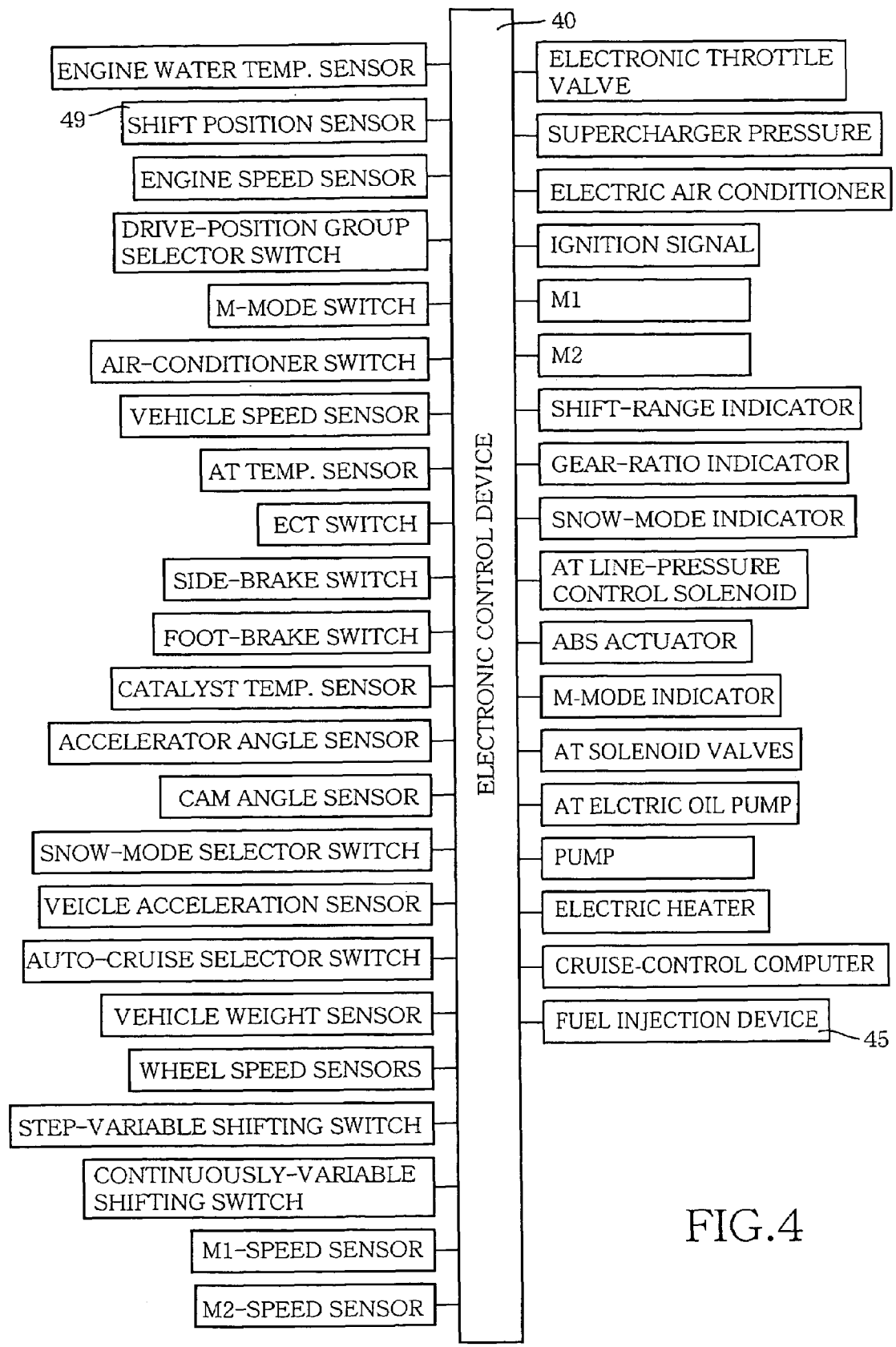
FIG. 4 is a view indicating input and output signals of the electronic control device provided to control the vehicular drive system of the embodiment of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the automatic transmission portion 20.

The electronic control device 40 is arranged to receive, from various sensors and switches shown in FIG. 4, various signals such as: a signal indicative of a temperature of cooling water of the engine; an output signal of a shift-position sensor 49 (shown in FIG. 5) indicative of a presently selected operating position $P_{SH}$ of a shift lever 48 (also shown in FIG. 5); a signal indicative of the operating speed $N_E$ of the engine 8; a signal indicative of a value indicating a selected group of forward-drive positions of the transmission mechanism 10; a signal indicative of an M mode (motor drive mode); a signal indicative of an operated state of an air conditioner; a signal indicative of a vehicle speed corresponding to the rotating speed of the output shaft 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an angle of operation of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the continuously-variable transmission portion 11 (power distributing mechanism 16) in the fixed-speed-ratio shifting state in which the transmission mechanism 10 functions as a step-variable transmission; a signal indicative of a continuously-variable shifting switch provided to place the continuously-variable transmission portion 11 (power distributing mechanism 16) in the continuously variable-shifting state in which the transmission mechanism 10 functions as the continuously variable transmission; a signal indicative of a rotating speed $N_{M1}$ of the first electric motor M1; and a signal indicative of a rotating speed $N_{M2}$ of the second electric motor M2.

The electronic control device 40 is further arranged to generate various signals such as: a signal to drive a throttle actuator for controlling an angle of opening of a throttle valve; a signal to control a fuel injection device 45 (shown in FIG. 5) for controlling an amount of injection of a fuel into the engine 8; a signal to control an ignition device for controlling a timing of ignition of the engine 8 by an ignition device (not shown); a signal to adjust a pressure of a supercharger; a signal to operate the electric air conditioner; signals to operate the electric motors M1 and M2; a signal to operate a shift-range indicator for indicating the selected operating position of the shift lever 48; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 provided to control the hydraulic actuators of the hydraulically operated frictional coupling devices of the power distributing mechanism 16 and the automatic transmission portion 20; a signal to operate an electric oil pump used as a hydraulic pressure source for the hydraulic control unit 42; a signal to drive an electric heater; and a signal to be applied to a cruise-control computer.

Reference is now made to the functional block diagram of FIG. 5 for explaining a method of controlling the transmission mechanism 10, that is, major control functions performed by the electronic control device 40. The electronic control device 40 includes a switching control portion 50, a hybrid control portion 52, a step-variable shifting control portion 54, a map memory 56, a high-speed-gear determining portion 62, a shift-position determining portion 80, an engine-stopping-condition determining portion 82, an engine-stop control portion 84, and an engine-stop vibration-region determining portion 86. The step-variable shifting control portion 54 is arranged to determine whether a shifting action of the transmission mechanism 10 should take place, that is, to determine one of the first through fifth gear positions to which the transmission mechanism 10 should be shifted. This determination is made on the basis of a detected state of the vehicle in the form of the detected vehicle speed V and a detected output torque $T_{OUT}$ of the automatic transmission portion 20, and according to a shifting boundary line map (step-variable shifting control map) which is stored in the map memory 56 and which represents shift-up boundary lines indicated by solid lines in FIG. 6 and shift-down boundary lines indicated by one-dot chain lines in FIG. 6. The step-variable shifting control portion 54 commands the hydraulic control unit 42 to automatically shift the automatic transmission portion 20 to the determined gear position. Described in detail, the step-variable shifting control portion 54 commands the hydraulic control unit 42 to selectively engage and release the hydraulically operated frictional coupling devices C1-C2, B1-B3, for establishing the determined gear position according to the table of FIG. 2.

The hybrid control portion 52 is arranged to control the engine 8 to be operated with high efficiency, and control the first and second electric motors M1, M2 so as to optimize a proportion of drive forces generated by the engine 8 and the second electric motor M2, and a reaction force generated by the first electric motor M1 during its operation as the electric generator, for thereby control the speed ratio γ0 of the continuously-variable transmission portion 11 operating as the electrically controlled continuously variable transmission, while the transmission mechanism 10 is placed in the continuously-variable shifting state, that is, while the continuously-variable transmission portion 11 is placed in the differential state. For instance, the hybrid control portion 52 calculates the output as required by the vehicle operator at the present running speed of the vehicle, on the basis of the operating amount $A_{CC}$ of the accelerator pedal 46 and the vehicle running speed V, and calculate a required vehicle drive force on the basis of the calculated required output and a required amount of generation of an electric energy by the first electric motor M1. On the basis of the calculated required vehicle drive force, the hybrid control portion 52 calculates desired speed $N_E$ and total output of the engine 8, and controls the actual output of the engine 8 and the amount of generation of the electric energy by the first electric motor M1, according to the calculated desired speed $N_E$ and total output of the engine 8. In other words, the hybrid control portion 52 is able to control the engine speed $N_E$ for a given value of the vehicle running speed V and for a given speed ratio of the automatic transmission portion 20 (for a given speed of the power transmitting member 18), by controlling the amount of generation of the electric energy by the first electric motor M1.

The hybrid control portion 52 is arranged to effect the above-described hybrid control while taking account of the presently selected gear position of the automatic transmission portion 20, so as to improve the drivability of the vehicle and the fuel economy of the engine 8. In the hybrid control, the continuously-variable transmission portion 11 is controlled to function as the electrically controlled continuously-variable transmission, for optimum coordination of the engine speed $N_E$ (desired engine speed $N_E^*$) and vehicle speed V for efficient operation of the engine 8, and the rotating speed of the power transmitting member 18 determined by the selected gear position of the automatic transmission portion 20. That is, the hybrid control portion 52 determines a target value of the overall speed ratio γT of the transmission mechanism 10, so that the engine 8 is operated according to a stored highest-fuel-economy curve (map). The target value of the overall speed ratio γT of the transmission mechanism 10 permits the engine torque $T_E$ and speed $N_E$ to be controlled so that the engine 8 provides an output necessary to drive the vehicle with the drive force required by the vehicle operator. The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 52 controls the speed ratio γ0 of the continuously-variable transmission portion 11, so as to obtain the target value of the overall speed ratio γT, so that the overall speed ratio γT can be controlled within a predetermined range, for example, between 13 and 0.5.

In the hybrid control, the hybrid control portion 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy. This electric path includes components associated with the generation of the electric energy and the consumption of the generated electric energy by the second electric motor M2.

It is also noted that the hybrid control portion 52 is capable of establishing a so-called "motor starting and drive" mode in which the vehicle is started and driven by only the electric motor (e.g., second electric motor M2) used as the drive power source, by utilizing the electric CVT function of the continuously-variable transmission portion 11, irrespective of whether the engine 8 is in the non-operated state or in the idling state. Where the vehicle is started by the engine 8 operated as the vehicle drive power source, rather than the electric motor, the hybrid control portion 52 controls the reaction force of the first electric motor M1 operated as the electric generator, so as to raise the rotating speed of the power transmitting member 18 owing to the differential function of the power distributing mechanism 16, for thereby controlling the vehicle starting by the engine 8. The vehicle is normally started by the electric motor, but is started by the engine 8 under some condition of the vehicle.

The hybrid control portion 52 is further capable of holding the engine 8 in an operated state owing to the electric CVT function of the continuously-variable transmission portion 11, irrespective of whether the vehicle is stationary or running at a relatively low speed. The first electric motor M1 may be required to be operated as the electric generator while the vehicle is stationary, in order to charge the electric-energy storage device 60 where an electric energy amount SOS stored in the storage device 60 is reduced below a predetermined lower limit. In this case, the speed $N_E$ of the engine 8 which is operated to operate the first electric motor M1 as the electric generator at a relatively high speed can be kept high enough to permit the operation of the engine 8 by itself, owing to the differential function of the power distributing mechanism 16, even while the operating speed of the second electric motor M2 determined by the vehicle speed V is substantially zero when the vehicle is stationary.

The hybrid control portion 52 is further capable of holding the engine speed $N_E$ constant owing to the electric CVT function of the continuously-variable transmission portion 11, by controlling the operating speed $N_{M1}$ of the first electric motor M1 and/or the operating speed $N_{M2}$ of the second electric motor M2, irrespective of whether the vehicle is stationary or running at a relatively low speed. In other words, the hybrid control portion 52 is arranged to control the operating speed $N_{M1}$ of the first electric motor M1 or the operating speed $N_{M2}$ of the second electric motor M2, as desired, while holding the engine speed $N_E$ constant. When the operating speed $N_{M2}$ of the second electric motor M2 is lowered, for example, the hybrid control portion 52 controls the first electric motor M1 to raise its operating speed $N_{M1}$ while lowering the operating speed $N_{M2}$ of the second electric motor M2 and holding the engine speed $N_E$ constant, as is apparent from the collinear chart of FIG. 3.

The hybrid control portion 52 is further capable of placing the continuously-variable transmission portion 11 in a power-disconnecting state in which the power transmitting path within the transmission portion 11 is disconnected to prevent transmission of a drive torque. This power-disconnecting state is established by holding the first and second electric motors M1, M2 in a freely rotatable state, that is, by preventing the electric motors M1, M2 from generating a reaction torque.

Figure 6:
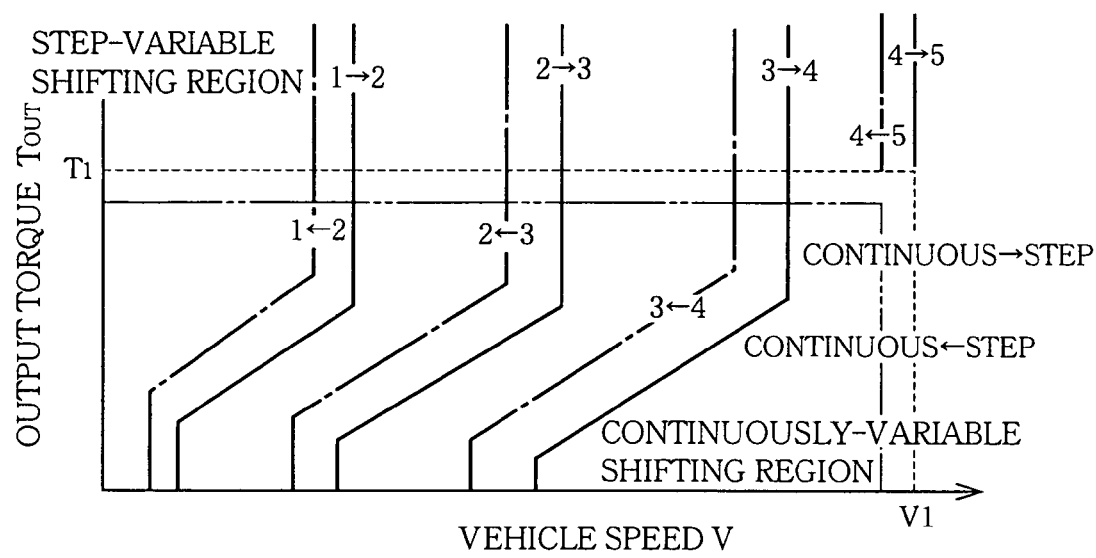
FIG. 6 is a view illustrating a stored shifting boundary line map (step-variable shifting control map) used for determining a shifting action of an automatic transmission portion of the transmission mechanism, in a two-dimensional coordinate system defined by an axis of a vehicle speed and an axis of an output torque of the automatic transmission portion, and a stored switching boundary line map (switching control map) in the same coordinate system, which is used for switching the transmission mechanism between the step-variable shifting state and the continuously-variable shifting state.

The high-speed-gear determining portion 62 is arranged to determine whether the gear position to which the transmission mechanism 10 should be shifted on the detected state of the vehicle and according to the shifting boundary line map of FIG. 6 stored in the map memory 56 is a high-speed-gear position, for example, the fifth gear position. This determination is made to determine which one of the switching clutch C0 and brake B0 should be engaged to place the transmission mechanism 10 in the step-variable shifting state.

The switching control portion 50 is arranged to determine whether the transmission mechanism 10 should be switched from the continuously-variable shifting state to the step-variable shifting state or vice versa, that is, whether the detected vehicle condition represented by the vehicle speed V and the output torque $T_{OUT}$ of the automatic transmission portion 20 is in a continuously variable shifting region for placing the transmission mechanism 10 in the continuously-variable shifting state, or in a step-variable shifting region for placing the transmission mechanism 10 in the step-variable shifting state. This determination is made on the basis of the detected vehicle condition and according to a switching boundary line map (switching control map) stored in the map memory 56. An example of the switching boundary line map is indicated by broken and two-dot chain lines in FIG. 6. The switching control portion 50 selectively places the transmission mechanism 10 in the continuously-variable shifting state or step-variable shifting state, depending upon whether the present vehicle condition is in the continuously-variable shifting region or step-variable shifting region.

When the switching control portion 50 determines that the detected vehicle condition is in the step-variable shifting region, the switching control portion 50 disables the hybrid control portion 52 to effect a hybrid control or continuously-variable shifting control, and enables the step-variable shifting control portion 54 to effect a predetermined step-variable shifting control in which the automatic transmission portion 20 is automatically shifted according to the shifting boundary line map of FIG. 6 stored in the map memory 56. In this step-variable shifting control, one of the gear positions of the automatic transmission portion 20 which is selected according to the shifting boundary line map of FIG. 6 is established by engaging the appropriate combination of the hydraulically operated frictional coupling devices C0, C1, C2, B0, B1, B2 and B3, as indicated in the table of FIG. 2, which indicates a predetermined relationship between each gear position of the transmission mechanism 10 and the corresponding combination of the frictional coupling devices. This relationship is also stored in the map memory 56. Namely, the continuously-variable transmission portion 11 and the automatic transmission portion 20 are operated as a step-variable automatic transmission which is automatically shifted on the basis of the detected vehicle condition and according to the shifting boundary line map of FIG. 6 and the predetermined relationship of FIG. 2.

When the high-speed-gear determining portion 62 has determined that the transmission mechanism 10 should be shifted to the fifth gear position, the switching control portion 50 commands the hydraulic control unit 42 to release the switching clutch C0 and engage the switching brake B0, for enabling the continuously-variable transmission portion 11 to function as an auxiliary transmission having a fixed speed ratio $\gamma 0$ of 0.7, for example, so that the transmission mechanism 10 as a whole is placed in a high-speed gear position so-called "an overdrive gear position" having a speed ratio lower than 1.0. When the high-speed-gear determining portion 62 has not determined that the transmission mechanism 10 should be shifted to the fifth gear position, the switching control portion 50 commands the hydraulic control unit 42 to engage the switching clutch C0 and release the switching brake B0, for enabling the continuously-variable transmission portion 11 to function as an auxiliary transmission having a fixed speed ratio $\gamma 0$ of 1.0, for example, so that the transmission mechanism 10 as a whole is placed in a speed-reducing gear position having a speed ratio not lower than 1.0. Thus, the continuously-variable transmission portion 11 operable as the auxiliary transmission is placed in a selected one of two gear positions under the control of the switching control portion 50 while the transmission mechanism 10 is placed in the step-variable shifting state in which the automatic transmission portion 20 connected in series to the continuously-variable transmission portion 11 functions as a step-variable transmission. While the vehicle condition is in the step-variable shifting region, therefore, the transmission mechanism 10 as a whole functions as a step-variable automatic transmission.

When the switching control portion 50 has determined that the detected vehicle condition is in the continuously-variable shifting region for placing the transmission mechanism 10 in the continuously-variable shifting state, the switching control portion 50 commands the hydraulic control unit 42 to release both of the switching clutch C0 and brake B0, for placing the continuously-variable transmission portion 11 in the continuously-variable shifting state. At the same time, the switching control portion 50 enables the hybrid control portion 52 to effect the hybrid control, and commands the step-variable shifting control portion 54 to select and hold a predetermined one of the gear positions, or to permit an automatic shifting control according to the shifting boundary line map stored in the map memory 56. In the latter case, the variable-step shifting control portion 54 effects the automatic shifting control by suitably selecting the combinations of the operating states of the frictional coupling devices indicated in the table of FIG. 2, except the combinations including the engagement of the switching clutch C0 and brake B0. Thus, the continuously-variable transmission portion 11 functions as the continuously variable transmission while the automatic transmission connected in series to the continuously-variable transmission portion 11 functions as the step-variable transmission, so that the transmission mechanism 10 provides a sufficient vehicle drive force, such that the speed of the rotary motion transmitted to the automatic transmission portion 20 placed in one of the first through fourth gear positions, namely, the rotating speed of the power transmitting member 18 is continuously changed, so that the speed ratio of the transmission mechanism 10 when the automatic transmission portion 20 is placed in one of those gear positions is continuously variable over a predetermined range. Accordingly, the speed ratio of the automatic transmission portion 20 is continuously variable through the adjacent gear positions, whereby the overall speed ratio $\gamma T$ of the transmission mechanism 10 is continuously variable.

The shifting boundary line map and the switching boundary line map shown in FIG. 6 will be described in detail. The shifting boundary line map which is stored in the map memory 56 and which is used for determining whether the automatic transmission 20 should be shifted represents shifting boundary lines defined in a rectangular two-dimensional coordinate system having an axis along which the vehicle speed V is taken, and an axis along which a drive-force-related value in the form of the output torque $T_{OUT}$ of the automatic transmission portion 20. In FIG. 6, the solid lines indicate the shift-up boundary lines, while the one-dot chain lines indicate the shift-down boundary lines. The broken lines in FIG. 6 indicate switching boundary lines which are represented by the switching boundary line map and which define the step-variable shifting region and the continuously-variable shifting region which are used by the switching control means 50. These switching boundary lines represent the upper vehicle-speed limit V1 and the upper output-torque limit T1 above which it is determined that the vehicle is in the high-speed or high-output running state. FIG. 6 also shows two-dot chain lines which are boundary lines offset with respect to the broken lines, by a suitable amount of control hysteresis, so that the broken lines and the two-dot chain lines are selectively used as the boundary lines. The switching boundary line map shown in FIG. 6 is used by the switching control means 50 to determine whether the vehicle is in the step-variable shifting state or the continuously-variable shifting state, depending upon whether the vehicle speed V and the output torque $T_{OUT}$ are higher than the predetermined upper limit values V, T1. The shifting boundary line map and the switching boundary line map may be stored in the map memory 56, as a complex map. The switching boundary line map may include at least one of the boundary lines representative of the upper vehicle-speed limit V1 and the upper output-torque limit T1, and may use only one of the two parameters V and $T_{OUT}$.

The shifting boundary line map and the switching boundary line map may be replaced by stored equations for comparison of the actual vehicle speed V with the limit value V1 and comparison of the actual output torque TOUT with the limit value T1. In this case, the switching control portion 50 switches the transmission mechanism 10 in the step-variable shifting state, when the detected actual vehicle speed V has exceeded the upper limit V1, or when the detected output torque $T_{OUT}$ of the automatic transmission portion 20 has exceeded the upper limit T1. The switching control portion 50 may be arranged to place the transmission mechanism 10 in the step-variable shifting state even when the vehicle condition is in the continuously-variable shifting region, upon detection of any functional deterioration or defect of the components such as the first and second electric motors M1, M2, inverter 58 and electric-energy storage device 50 which are associated with the electric path described above and which are operable to operate the continuously-variable transmission portion 11 as the electrically controlled continuously variable transmission.

The drive-force-related value indicated above is a parameter corresponding to the drive force of the vehicle, which may be the output torque $T_{OUT}$ of the automatic transmission portion 20, the output torque $T_E$ of the engine 8 or an acceleration value of the vehicle, as well as a drive torque or drive force of drive wheels 38. The engine torque $T_E$ may be an actual value calculated on the basis of the operating amount $A_{CC}$ of the accelerator pedal 46 or the opening angle of the throttle valve (or intake air quantity, air/fuel ratio or amount of fuel injection) and the engine speed $N_E$, or an estimated value of the engine torque $T_E$ or required vehicle drive force which is calculated on the basis of the operating amount $A_{CC}$ of the accelerator pedal 46 by the vehicle operator or the operating angle of the throttle valve. The vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper limit V1 of the vehicle speed is determined so that the transmission mechanism 10 is placed in the step-variable shifting state while the vehicle speed V is higher than the upper limit V1. This determination is effective to minimize a possibility of deterioration of the fuel economy of the vehicle if the transmission mechanism 10 were placed in the continuously-variable shifting state at a relatively high running speed of the vehicle. The upper limit T1 of the output torque $T_{OUT}$ is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 7:
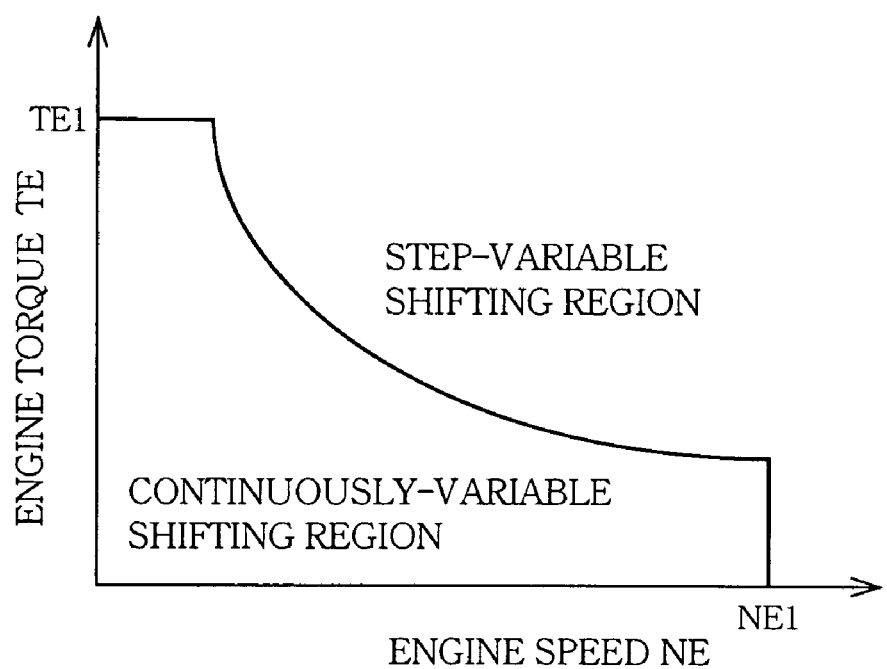
FIG. 7 is a view illustrating a shifting-region switching map indicating boundary lines defining a step-variable shifting region and a continuously-variable shifting region in a two-dimensional coordinate system defined by an axis of an engine speed and an axis of an engine torque, the boundary lines of those shifting regions corresponding to boundary lines of the switching control map represented by broken lines in FIG. 6.

Referring to FIG. 7, there is shown a shifting-region switching map indicating boundary lines defining the step-variable shifting region and continuously-variable shifting region in a two-dimensional coordinate system which is defined by an axis of the engine speed $N_E$ and an axis of the engine torque $N_T$. The boundary lines of the shifting-region switching map are considered to be output lines of the engine 8 defined by the engine speed and output $N_E$, $N_T$. The switching boundary line map, which is indicated by the broken lines in FIG. 6 and which is used by the switching control portion 50 to determine whether the vehicle condition is in the continuously-variable or step-variable shifting region, is based on the map of FIG. 8. The switching control portion 50 may use the shifting-region switching map of FIG. 7 in place of the switching boundary line map of FIG. 6, to determine whether the detected vehicle condition is in the continuously-variable or step-variable shifting region.

Figure 8:
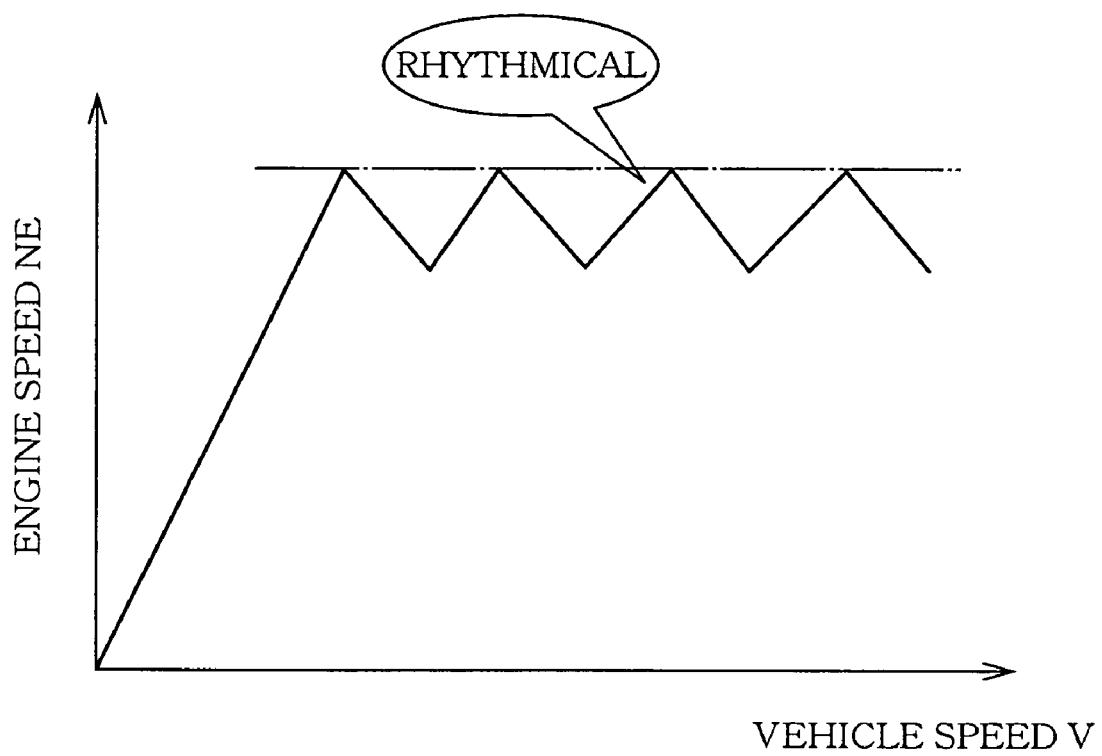
FIG. 8 is a view indicating an example of a change of the engine speed as a result of a shift-up action of the step-variable automatic transmission portion.

The step-variable shifting region defined by the switching boundary line map of FIG. 6 is defined as a high-torque region (high output drive region) in which the output torque $T_{OUT}$ of the automatic transmission portion 20 is not lower than the predetermined upper limit $T_1$, or a high-speed region in which the vehicle speed V is not lower than the predetermined upper limit $V_1$. Accordingly, the step-variable shifting control is effected when the torque $T_E$ of the engine 8 is comparatively high or when the vehicle speed V is comparatively high, while the continuously-variable shifting control is effected when the torque $T_E$ of the engine 8 is comparatively low or when the vehicle speed V is comparatively low, that is, when the engine 8 is in a normal output state. Similarly, the step-variable shifting region defined by the shifting-region switching map of FIG. 7 is defined as a high-torque region in which the engine torque $T_E$ is not lower than the predetermined upper limit $T_{E1}$, or a high-speed region in which the engine speed $N_E$ is not lower than the predetermined upper limit $N_{E1}$, or alternatively defined as a high-output region in which the output of the engine 8 calculated on the basis of the engine torque $N_T$ and speed $N_E$ is not lower than a predetermined limit. Accordingly, the step-variable shifting control is effected when the torque $T_E$, speed $N_E$ or output of the engine 8 is comparatively high, while the continuously-variable shifting control is effected when the torque $T_E$, speed $N_E$ or output of the engine 8 is comparatively low, that is, when the engine 8 is in the normal output state. The boundary lines of the shifting-region switching map of FIG. 7 may be considered as high-speed threshold lines or high-engine-output threshold lines, which define upper limit of the vehicle speed V or engine output above In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the hybrid vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the continuously-variable transmission portion 11 (power distributing mechanism 16) functions as the electrically-controlled continuously variable transmission. In a high-output running state of the vehicle with the output torque Tour higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors. Alternatively, in the high-output running state of the vehicle, the transmission mechanism 10 is placed in the step-variable shifting state (fixed-speed-ratio shifting state), so that the engine speed NE changes with a shift-up action of the automatic transmission portion 20, assuring a comfortable rhythmic change of the engine speed $N_E$ as the automatic transmission portion 20 is shifted up, as indicated in FIG. 8. Stated in the other way, when the engine is in the high-output state, it is more important to satisfy a vehicle operator's desire to improve the drivability of the vehicle, than a vehicle operator's desire to improve the fuel economy. In this respect, the transmission mechanism 10 is switched from the continuously-variable shifting state to the step-variable shifting state (fixed-speed-ratio shifting state) when the engine output becomes relatively high. Accordingly, the vehicle operator is satisfied with a comfortable rhythmic change of the engine speed $N_E$ during the high-output operation of the engine, as indicated in FIG. 8.

Figure 9:
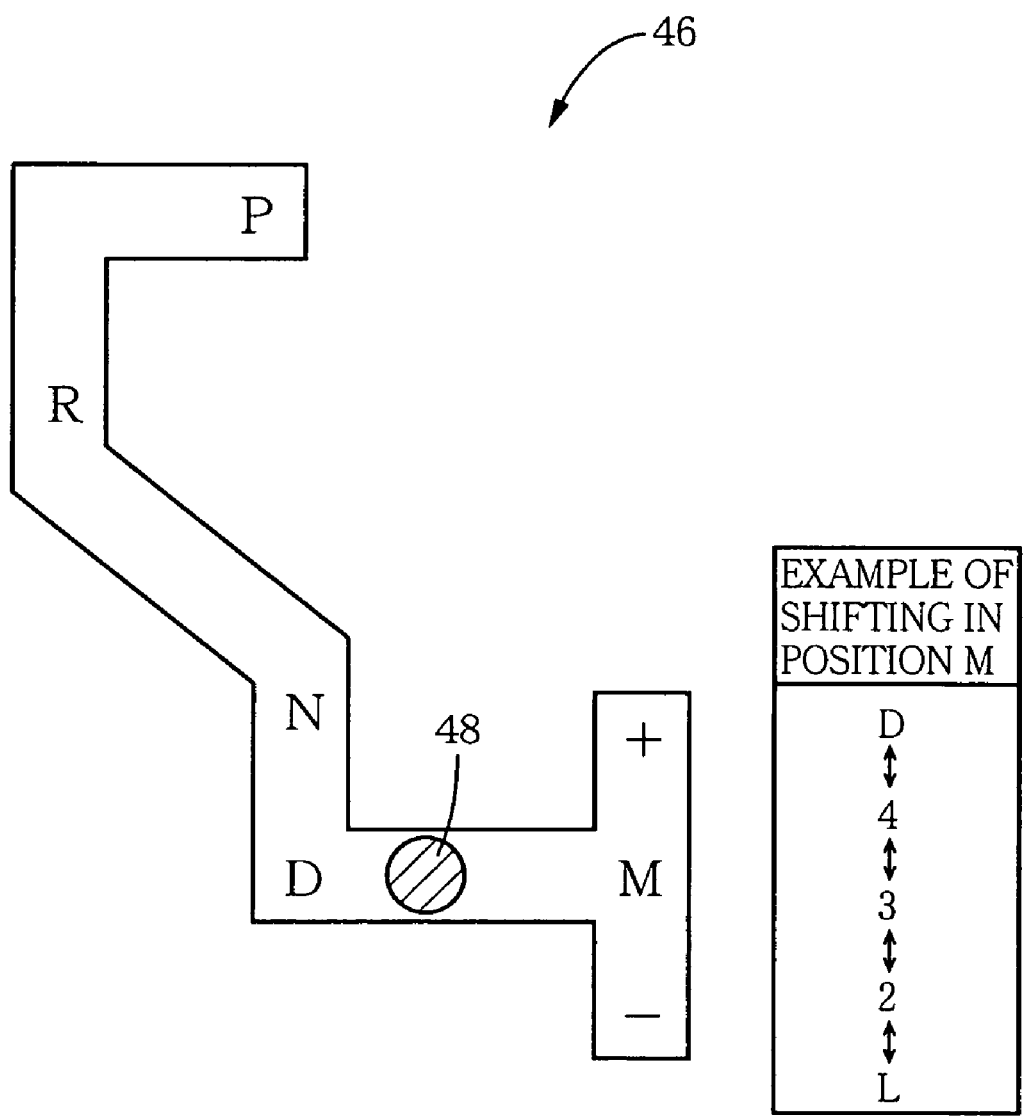
FIG. 9 is a view illustrating an example of a manually operable shifting device having a plurality of operating positions.

FIG. 9 shows an example of a manually operable shifting device in the form of a shifting device 46 including the above-described shift lever 48, which is disposed laterally adjacent to an operator's seat, for example, and which is manually operated to select one of a plurality of gear positions consisting of a parking position P for placing the transmission mechanism 10 (namely, automatic transmission 20) in a neutral state in which a power transmitting path is disconnected with both of the clutches C1 and C2 placed in the released state, while at the same time the output shaft 22 of the automatic transmission 20 is in the locked state; a reverse-drive position R for driving the vehicle in the rearward direction; a neutral position N for placing the transmission mechanism 10 in the neutral state; an automatic forward-drive shifting position D; and a manual forward-drive shifting position M.

The hydraulic control unit 42 incorporates a manual valve operatively connected to the shift lever 48. When the shift lever 48 is operated to a selected one of the positions P, R, N, D and M, the manual valve manual valve is operated to establish the corresponding state of the hydraulic control unit 42. In the automatic forward-drive shifting position D or the manual forward-drive shifting position M, one of the first through fifth gear positions ($1^{st}$ through $5^{th}$) indicated in the table of FIG. 2 is established by engaging the corresponding combination of the clutches C0-C2 and brakes B0-B3, by controlling solenoid-operated valves incorporated in the hydraulic control unit 42.

The parking position P and the neutral position N are non-driving positions selected when the vehicle is not driven, while the reverse-drive position R, and the automatic and manual forward-drive shifting positions D, M are driving positions selected when the vehicle is driven. In the non-driving positions P, N, the power transmitting path in the automatic transmission portion 20 is in a power-cut-off state established by releasing both of the clutches C1 and C2, as shown in the table of FIG. 2. In the driving positions R, D, M, the power transmitting path in the automatic transmission portion 20 is in a power-transmitting state established by engaging at least one of the clutches C1 and C2, as also shown in the table of FIG. 2.

Described in detail, a manual operation of the shift lever 48 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 48 from the neutral position N to the automatic forward-drive shifting position D causes at least the first clutch C1 to be engaged for switching the power transmitting path in the automatic transmission portion 20 from the power-cut-off state to the power-transmitting state. The automatic forward-drive shifting position D provides a highest-speed position, and positions "4" through "L" selectable in the manual forward-drive shifting position M are engine-braking positions in which an engine brake is applied to the vehicle.

The manual forward-drive shifting position M is located at the same position as the automatic forward-drive shifting position D in the longitudinal direction of the vehicle, and is spaced from or adjacent to the automatic forward-drive shifting position D in the lateral direction of the vehicle. The shift lever 48 is operated to the manual forward-drive shifting position M, for manually selecting one of the above-indicated positions "D" through "L". Described in detail, the shift lever 48 is movable from the manual forward-drive shifting position M to a shift-up position "+" and a shift-down position "−", which are spaced from each other in the longitudinal direction of the vehicle. Each time the shift lever 48 is moved to the shift-up position "+" or the shift-down position "−", the presently selected position is changed by one position. The five positions "D" through "L" have respective different lower limits of a range in which the overall speed ratio $\gamma T$ of the transmission mechanism 10 is automatically variable, that is, respective different lowest values of the overall speed ratio $\gamma T$ which corresponds to the highest output speed of the transmission mechanism 10. Namely, the five positions "D" through "L" select respective different numbers of the speed positions or gear positions of the automatic transmission 20 which are automatically selectable, so that the lowest overall speed ratio $\gamma T$ available is determined by the selected number of the gear positions. The shift lever 48 is biased by biasing means such as a spring so that the shift lever 48 is automatically returned from the shift-up position "+" and shift-down position "−" back to the manual forward-drive shifting position M. The shifting device 46 is provided with shift-position sensors operable to detect the presently selected position of the shift lever 48, so that signals indicative of the presently selected operating position of the shift lever 48 and the number of shifting operations of the shift lever 48 in the manual forward-shifting position M.

When the shift lever 48 is operated to the automatic forward-drive shifting position D, the switching control means 50 effects an automatic switching control of the transmission mechanism 10 according to the stored switching boundary line map indicated in FIG. 6, and the hybrid control means 52 effects the continuously-variable shifting control of the power distributing mechanism 16, while the step-variable shifting control means 54 effects an automatic shifting control of the automatic transmission 20. When the transmission mechanism 10 is placed in the step-variable shifting state, for example, the shifting action of the transmission mechanism 10 is automatically controlled to select an appropriate one of the first through the fifth gear position indicated in FIG. 2. When the drive system is placed in the continuously-variable shifting state, the speed ratio of the power distributing mechanism 16 is continuously changed, while the shifting action of the automatic transmission 20 is automatically controlled to select an appropriate one of the first through fourth gear positions, so that the overall speed ratio $\gamma T$ of the transmission mechanism 10 is controlled so as to be continuously variable within the predetermined range. The automatic forward-drive shifting position D is a position selected to establish an automatic shifting mode (automatic mode) in which the transmission mechanism 10 is automatically shifted.

When the shift lever 48 is operated to the manual forward-drive shifting position M, on the other hand, the shifting action of the transmission mechanism 10 is automatically controlled by the switching control means 50, hybrid control means 52 and step-variable shifting control means 54, such that the overall speed ratio $\gamma T$ is variable within a predetermined range the lower limit of which is determined by the gear position having the lowest speed ratio, which gear position is determined by the manually selected one of the positions "D" through "L". When the transmission mechanism 10 is placed in the step-variable shifting state, for example, the shifting action of the transmission mechanism 10 is automatically controlled within the above-indicated predetermined range of the overall speed ratio $\gamma T$. When the transmission mechanism 10 is placed in the step-variable shifting state, the speed ratio of the power distributing mechanism 16 is continuously changed, while the shifting action of the automatic transmission 20 is automatically controlled to select an appropriate one of the gear positions the number of which is determined by the manually selected one of the positions "D" through "L", so that the overall speed ratio $\gamma T$ of the transmission mechanism 10 is controlled so as to be continuously variable within the predetermined range. The manual forward-drive position M is a position selected to establish a manual shifting mode (manual mode) in which the selectable gear positions of the transmission mechanism 10 are manually selected.

Referring back to the block diagram of FIG. 5, the shift-position determining portion 80 is arranged to determine the presently selected position $P_{SH}$ of the shift lever 48, on the basis of the output signal of the shift-position sensor 49. For example, the shift-position determining portion 80 is arranged to determine whether the shift lever 48 is placed in the parking position P or neutral position N, that is, placed in one of the non-driving positions. Alternatively, the shift-position determining portion 80 is arranged to determine whether the shift lever 48 is placed in the reverse-drive position R, automatic forward-drive shifting position D or manual forward-drive shifting position M, that is, placed in one of the driving positions. In either of these cases, the determination by the shit-position determining portion 80 is made on the basis of the output signal of the shift-position sensor 49.

The engine-stopping-condition determining portion 82 is arranged to determine whether any predetermined engine-stopping condition for stopping the engine 8 by stopping a fuel supply to the engine 8 is satisfied. For instance, the engine-stopping-condition determining portion 82 is arranged to determine that the engine-stopping condition is satisfied in one of the following cases, for example: 1) when the vehicle drive system is placed in a motor-drive mode; 2) when the vehicle is stationary, 3) when a warm-up operation of the engine 8 has been completed; and 4) when the vehicle is in a decelerating state with the accelerator pedal placed in its non-operated position.

Described in detail, the map memory 56 also stores a drive-power-source switching map representative of a boundary line which defines an engine-drive region for driving the vehicle in an engine-drive mode with the engine 8, and a motor-drive region for driving the vehicle in the above-indicated motor-drive mode. The engine-drive and motor-drive regions are defined in a two-dimensional coordinate system having an axis along which the vehicle speed V is taken, and an axis along which the output torque $T_{OUT}$ of the automatic transmission portion 20 is taken. One of the engine-drive and motor-drive modes is selected depending upon whether the vehicle condition represented by the detected vehicle speed V and output torque $T_{OUT}$ is in the engine-drive region or the motor-drive region. The engine-stopping-condition determining portion 82 determines that the engine-stopping condition is satisfied when it is determined according to the drive-power-source switching map that the vehicle condition is in the motor-drive region.

The engine-stopping-condition determining portion 82 determines that the engine-stopping condition is satisfied also when it is determined that the electric energy amount SOC stored in the electric-energy storage device 60 is larger than a predetermined upper limit above which an operation of the engine 8 to drive the first electric motor M1 to charge the electric-energy storage device 60 while the vehicle is stationary is inhibited. This determination is made on the basis of the signals indicative of the vehicle speed V and the stored electric energy amount SOC, which signals are received by the electronic control device 40.

The engine-stopping-condition determining portion 82 determines that the engine-stopping condition is satisfied also when it is determined that the warm-up operation of the engine 8 has been completed. This determination is made on the basis of the signals indicative of the engine water temperature or catalyst temperature, which signals are received by the electronic control device 40.

The engine-stopping-condition determining portion 82 determines that the engine-stopping condition is satisfied also when it is determined that the vehicle is in a decelerating state with the accelerator pedal placed in its non-operated position. This determination is made on the basis of the signal indicative of the operating amount $A_{CC}$ of the accelerator pedal, which signal is received by the electronic control device 40.

The engine-stop control portion 84 is arranged to command an engine-output control device 43 (shown n FIG. 5) to effect a fuel-cut control for stopping a fuel supply to the engine 8 by the fuel injection device 45, when the engine-stopping-condition determining portion 82 has determined that the engine-stopping condition is satisfied. When the engine 8 is stopped with the fuel-cut control, the engine torque $T_E$ is zeroed, and the first electric motor M1 is in a free state without generation of a reaction torque, so that the engine speed $N_E$ is lowered to zero, as indcted in the time chart of FIG. 12.

The vehicle is subject to various kinds of vibration, which cause noises that are uncomfortable to the vehicle operator and passengers (vehicle occupants) and are ecologically undesirable. In this respect, it is desirable to minimize the level of the vibration. For example, the engine 8 which is a vibration source has a variation in its torque $T_E$, which may cause torsional vibration of the transmission mechanism 10 (drive system) that includes the crankshaft of the engine 8 and the drive shafts of the first and second electric motors M1, M2. The torsional vibration is amplified by a resonance phenomenon and transmitted to the body of the vehicle through a damping device such as engine mounts. This vibration and the resulting noise are uncomfortable to the vehicle occupants, if the levels of the vibration and noise are considerable high.

For instance, the resonance phenomenon may take place in a specific speed range of the engine 8 called "resonance speed range", that is, a speed range the upper limit of which is not higher than an idling speed $N_{IDL}$ of the engine. The engine speed $N_E$ may fall into the resonance speed range in the process of lowering of the engine speed NE to zero as a result of stopping of the engine 8 when any engine-stopping condition is satisfied.

To reduce the resonance of the power transmitting system which cause a high level of vibration of the vehicle body, the control device according to the present embodiment of this invention is arranged to control the transmission mechanism 10 such that the engine speed $N_E$ is lowered to zero so as to pass through the resonance speed range at a high rate. That is, the engine speed $N_E$ is controlled by controlling the first electric motor M1 so that the engine speed NE is lowered at a high rate through the resonance speed range of around 400 r.p.m. in which the vibration of the vehicle body due to the resonance phenomenon of the drive system is higher than a tolerable limit.

The resonance speed range of the engine 8 is a speed range in which the resonance of the drive system that causes a vibration of the vehicle body the level of which is higher than an upper limit is expected to take place. When the vibration level caused by the resonance is higher than the upper limit, this vibration is considered uncomfortable to the vehicle occupants. This resonance speed range is obtained by experimentation and stored in the ROM of the electronic control device 40. The resonance speed range may be obtained by experimentation, for each of different conditions of the vehicle which are determined by the vehicle speed V, the number of operable cylinders of the engine 8 (where the engine 8 is a variable-cylinder engine), the number of cycles of the engine 8 (where the engine 8 is a variable-cycle engine equipped with solenoid-operated valves), etc. as well as the speed $N_E$ of the engine 8. In this respect, it is noted that the resonance may or may not take place, at given engine values of the speed $N_E$ and vehicle speed V, depending upon the other vehicle conditions as described above. In view of this fact, the resonance speed ranges may be obtained for the respective different conditions of the vehicle that affect a possibility of occurrence of the resonance. There will be described in detail a manner of control of the transmission mechanism 10 (vehicular drive system) so as to reduce the resonance of the drive system due to or upon stopping of the engine 8.

When the engine-stopping-condition determining portion 82 has determined that the engine-stopping condition is satisfied, the engine-stop control portion 84 is arranged not only to effect the fuel-cut control, but also to command the hybrid control portion 52 to control the first electric motor M1 so as to lower the engine speed $N_E$ such that the engine speed $N_E$ is rapidly lowered through the specific resonance speed range in which the resonance is expected to occur, causing a vibration of the vehicle the level of which is higher than the upper limit. In response to this command received from the engine-stop control portion 84, the hybrid control portion 52 switches the first electric motor M1 from the free state to the driving state, and lowers the operating speed $N_{M1}$ of the first electric motor M1, for thereby lowering the engine speed $N_E$ at a high rate. The rate at which the speed $N_{M1}$ of the first electric motor M1 is lowered by the hybrid control portion 52 is obtained by experimentation, such that the rate at which the engine speed $N_E$ is lowered is higher than the normal rate when the engine 8 is stopped in the normal manner, without an operation of the engine-stop control portion 84. With the speed NM1 being lowered at the predetermined high rate, the engine speed $N_E$ is lowered at a rate high enough to reduce a possibility of occurrence of vibration of the vehicle body whose level is higher than the upper limit.

Upon stopping of the engine 8 under the control of the engine-stop control portion 84 initiated when the engine-stopping-condition determining portion 82 has determined that the engine-stopping condition is satisfied, the engine 8 may suffer from a so-called "undershoot" phenomenon in which the engine speed $N_E$ is lowered below zero, namely, the engine 8 is rotated in the reverse direction after the engine speed $N_E$ is zeroed. This undershoot phenomenon may take place depending upon the rate of lowering of the engine speed $N_E$ by lowering the speed $N_{M1}$ of the first electric motor M1, and/or the rate of lowering of the engine speed $N_E$ in the normal manner of stopping of the engine 8. In view of this tendency of the undershoot phenomenon, the engine-stop control portion 84 is arranged to command the hybrid control portion 52 to lower the speed $N_{M1}$ of the first electric motor M1 such that the engine speed $N_E$ is lowered at a rate not higher than a value above which the undershoot phenomenon takes place. That is, the engine-stop control portion 84 is arranged such that the engine 8 is stopped so as to prevent the occurrence of the undershoot phenomenon.

The continuously-variable transmission portion 11 is switchable between the continuously-variable shifting state and the step-variable shifting state (fixed-speed-ratio shifting state), as described above. In the continuously-variable shifting state of the continuously-variable transmission portion 11, the engine speed $N_E$ can be controlled without an influence or governed by the vehicle speed V or rotating speed of the power transmitting member 18, owing to the electrical continuously variable shifting function of the continuously-variable transmission portion 11. Accordingly, by lowering the speed $N_{M1}$ of the first electric motor M1 under the control of the engine-stop control portion 84 in the continuously-variable shifting state of the continuously-variable transmission portion 11, the engine speed $N_E$ can be lowered to zero at a high rate through the resonance speed range. When the shift-position determining portion 80 has determined that the shift lever 48 is in one of the driving positions D, M and the continuously-variable transmission portion 11 is placed in the step-variable shifting state (fixed-speed-ratio shifting state), however, the engine 8 is operatively connected to the drive wheels 38, so that the engine speed $N_E$ is influenced or governed by the vehicle speed V, and cannot be controlled as needed under the control of the engine-stop control portion 84. Thus, in the step-variable shifting state of the continuously-variable transmission portion 11, the engine speed $N_E$ cannot be rapidly lowered through the resonance speed range, by lowering the speed $N_{M1}$ of the first electric motor M1 under the control of the engine-stop control portion 84.

In view of the above-described drawback, the switching control portion 50 holds the continuously-variable transmission portion 11 in the presently established continuously-variable shifting state or switches the transmission portion 11 from the step-variable shifting state to the continuously-variable shifting state by releasing the switching clutch C0 or brake B0, to permit the hybrid control portion 52 to lower the engine speed $N_E$ rapidly through the resonance speed range by lowering the speed $N_{M1}$ of the first electric motor M1, when the engine-stopping-condition determining portion 82 has determined that the engine-stopping condition is satisfied and when the shift-position determining portion 80 has determined that the shift lever 48 is placed in the driving position D or M. Thus, the switching control portion 50 functions to as an engine-stop switching control portion operable to switch the continuously-variable transmission portion 11 to the continuously-variable shifting state when the engine speed $N_E$ is lowered under the control of the engine-stop control portion 84 upon stopping of the engine 8.

Figure 10A:
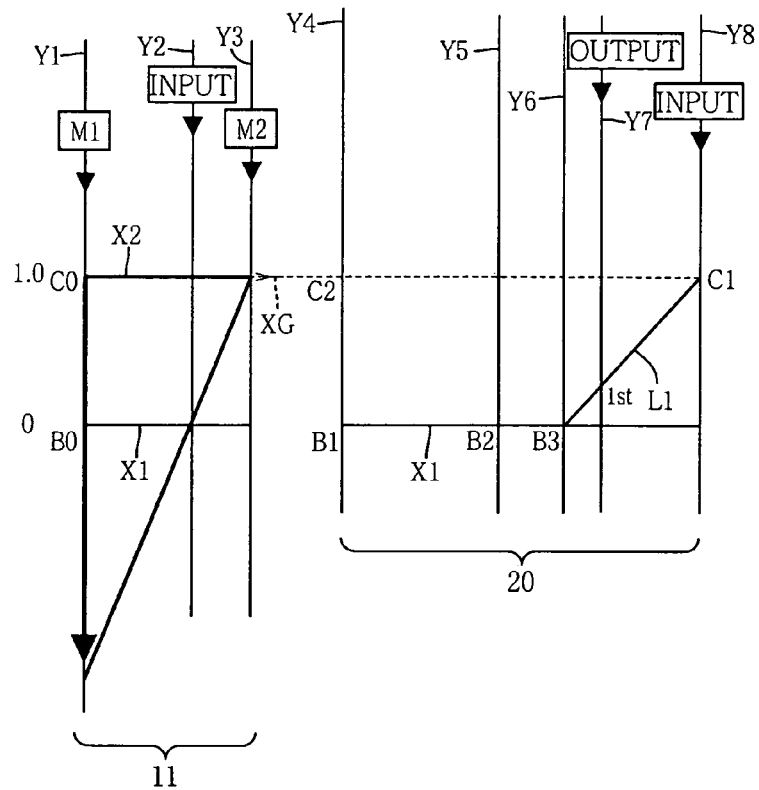
FIGS. 10A and 10B are views showing zeroing of the engine speed upon stopping of the engine, by an operation of a first electric motor of the drive system with a releasing action of a switching clutch of a continuously-variable transmission portion of the transmission mechanism to switch this transmission portion from a fixed-speed-ratio shifting state (step-variable shifting state) to a continuously-variable shifting state, FIG. 10A showing a case where the automatic transmission portion is in a first gear position, while FIG. 10B showing a case where the automatic transmission portion is in a reverse drive gear position.
Figure 10B:
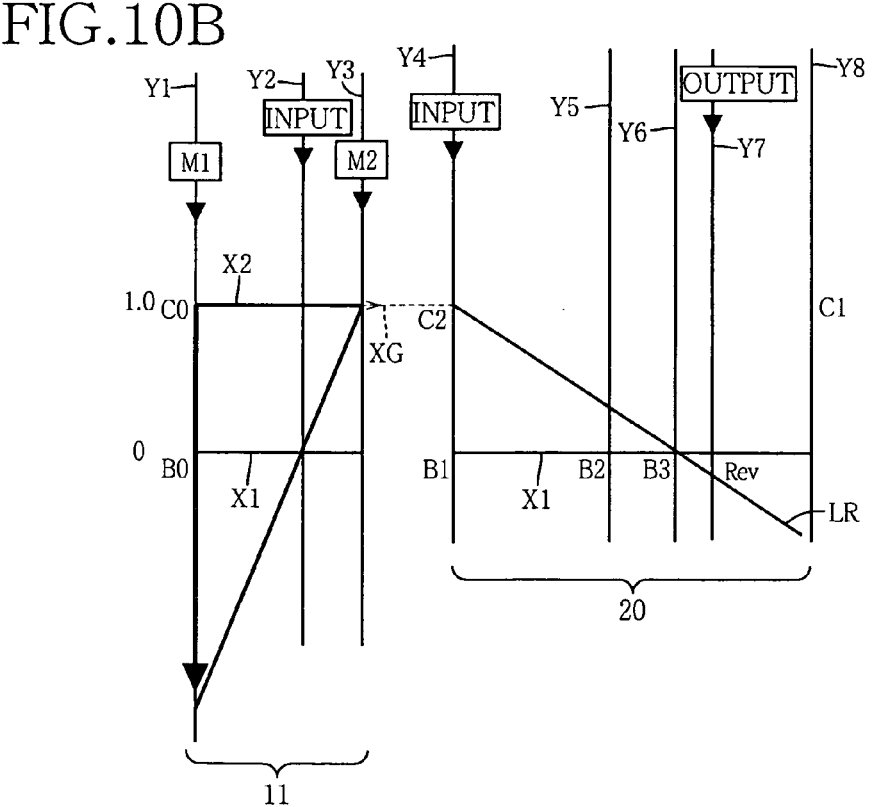
Figure 12:
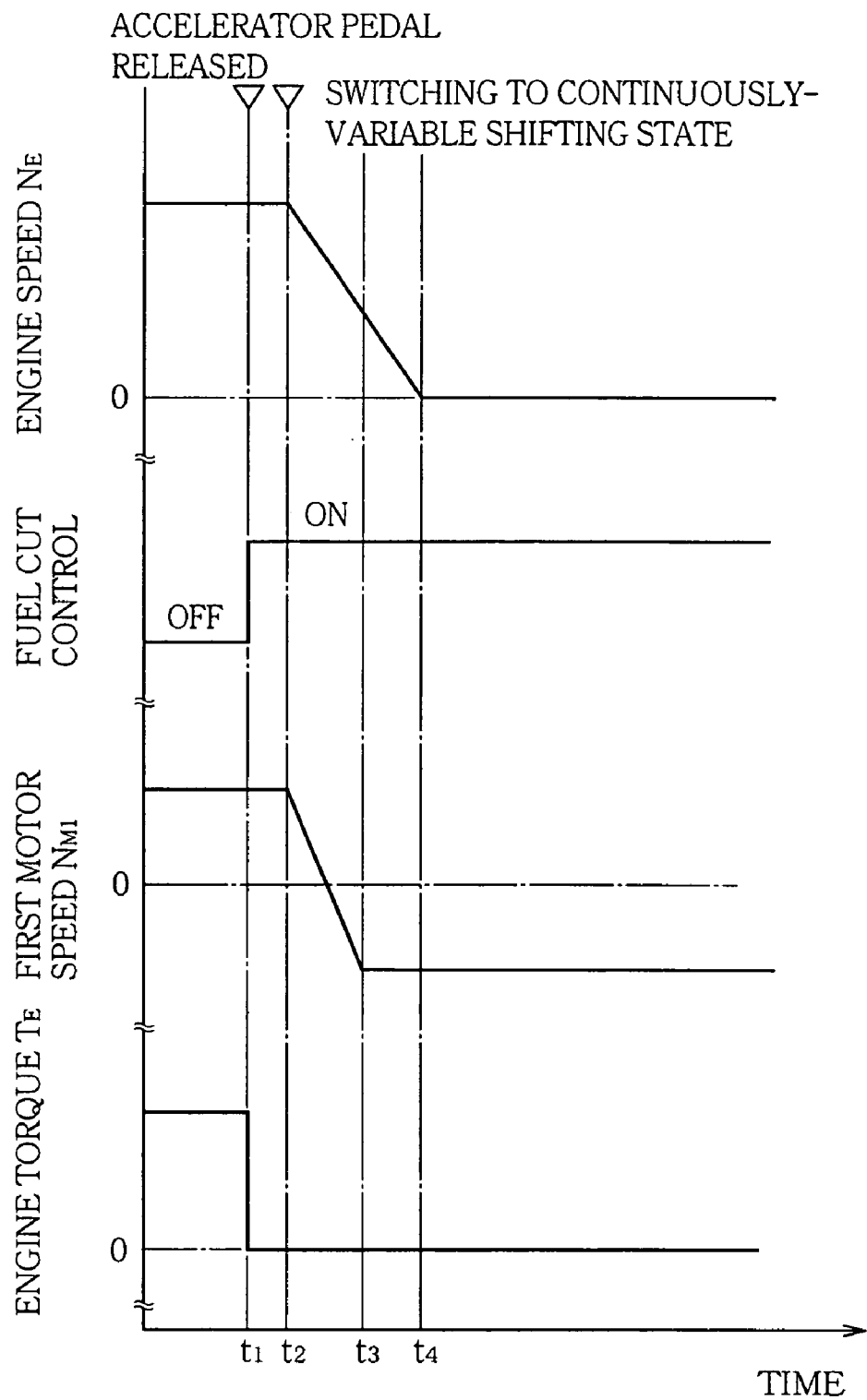
FIG. 12 is a time chart for explaining an operation performed according to the engine-stop control routine of the flow chart of FIG. 11, to reduce the resonance phenomenon of the drive system upon stopping of the engine as a result of a releasing operation of an accelerator pedal in the fixed-speed-ratio shifting state of the continuously-variable transmission portion.

Thus, the engine speed $N_E$ is lowered rapidly or at a predetermined high rate through the resonance speed range under the control of the engine-stop control portion 84, upon stopping of the engine 8, as shown in the time chart of FIG. 12, with the continuously-variable transmission portion 11 being switched from the step-variable shifting state to the continuously-variable shifting state, by a releasing action of the switching clutch C0 which has been placed in the engaged state to establish the step-variable shifting state. FIG. 10A shows the state when the automatic transmission portion 20 is placed in the first gear position, while FIG. 10B sows the state when the automatic transmission portion 20 is placed in the reverse-drive position. In either of these two cases, the speed $N_{M1}$ of the first electric motor M1 (indicated along the vertical straight line Y1) is lowered to lower the engine speed $N_E$ (indicated along the vertical straight line Y2) to zero. After the engine speed $N_E$ is zeroed, the first electric motor M1 is placed in the free state.

Where the vehicle body does not suffer from a resonance that causes the vehicle vibration level to exceed the upper limit upon stopping of the engine 8, the switching control portion 50 need not switch the continuously-variable transmission portion 11 to the continuously-variable shifting state.

The engine-stop-resonance determining portion 86 is arranged to determine whether a resonance of the drive system causing the vehicle vibration level to exceed the upper limit is expected to take place upon stopping of the engine 8. This determination is made depending upon whether the engine speed $N_E$ is lowered through the resonance speed range upon stopping of the engine 8. Described more specifically, the engine-stop-resonance determining portion 86 determines that the resonance causing the vehicle vibration level higher than the upper limit is expected to take place if the engine speed $N_E$ represented by the engine-speed signal received from the electronic control device 40 upon determination by the engine-stopping-condition determining portion 82 that the engine-stopping condition is satisfied is higher than the upper limit of the predetermined resonance speed range.

If the engine-stop-resonance determining portion 86 does not determine that the resonance causing the vehicle vibration level higher than the upper limit is expected to take place, the switching control portion 50 does not to switch the continuously-variable transmission portion 11 (transmission mechanism 10) from the step-variable shifting state (fixed-speed-ratio shifting state) to the continuously-variable shifting state, even when the engine-stopping-condition determining portion 82 has determined that the engine-stopping condition is satisfied and when the shift-position determining portion 80 has determined that the shift lever 48 is placed in the driving position D, M.

If the shift-position determining portion 80 determines that the shift lever 48 is placed in the non-driving position P, N, the power transmitting path in the automatic transmission portion 20 is in the power-cut-off state, so that the engine speed $N_E$ can be controlled without an influence or governed by the vehicle speed V, even while the continuously-variable transmission portion 11 is placed in the step-variable shifting state. In this case, therefore, the transmission portion 11 need not be switched from the step-variable shifting state to the continuously-variable state upon stopping of the engine 8.

Figure 11:
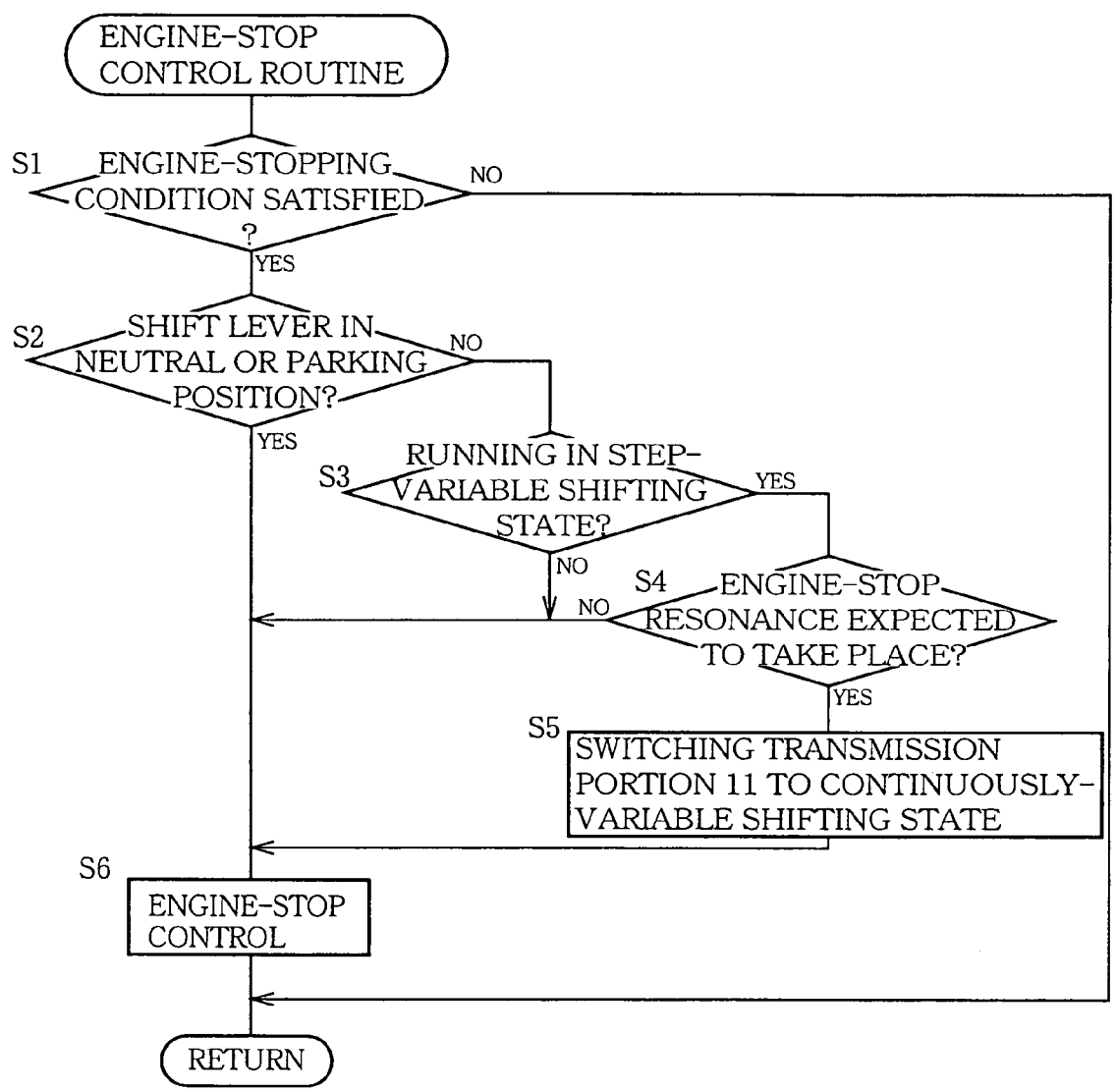
FIG. 11 is a flow chart illustrating an engine-stop control routine executed by the electronic control device of FIG. 5, to reduce vibration of the hybrid vehicle upon stopping of the engine.

Referring to the flow chart of FIG. 11, there will be described an engine-stop control routine executed by the electronic control device 40 upon stopping of the engine 8, so as to reduce a possibility of occurrence of a resonance phenomenon of the transmission mechanism 10 of the drive system of the hybrid vehicle. This engine-stop control routine is repeated executed with an extremely short cycle time of about several microseconds or several tens of microseconds. The flow chart of FIG. 12 indicates an example of changes of various parameters when the engine-stop control routine is executed, upon stopping of the engine 8 with a releasing action of the accelerator pedal in the step-variable shifting state (locked state) of the continuously-variable transmission portion 11, so as to prevent occurrence of a resonance phenomenon causing the vehicle vibration level higher than the upper limit, The engine-stop-control routine of FIG. 11 is initiated with step S1 corresponding to the engine-stopping-condition determining portion 82, to determine whether the predetermined condition for stopping the engine 8 by stopping the fuel supply to the engine 8 by the fuel injection device 45 is satisfied or not. For example, this determination in step S1 is made on the basis of the detected operating amount $A_{CC}$ of the accelerator pedal represented by the signal received by the electronic control device 40. For example, the engine-stopping condition is satisfied, that is, an affirmative decision (YES) is obtained in step S1 at a point of time t1 indicated in the time chart of FIG. 12 when it is determined that the vehicle is in a decelerating state with the accelerator pedal placed in its non-operated state. In this case, the engine-stop control portion 84 commands the engine output control device 43 to effect the fuel-cut control (not shown in the flow chart of FIG. 11) at the point of time t1.

When a negative decision (NO) is obtained in step S1, one cycle of execution of the present engine-stop control routine is terminated. When the affirmative decision (YES) is obtained in step S1, the control flow goes to step S2 corresponding to the shift-position determining portion 80, to determine whether the shift lever 48 is in the non-driving position, namely, in the parking position P or neutral position N. This determination in step S2 is made on the basis of the presently selected position $P_{SH}$ represented by the shift-position signal received from the shift-position sensor 49.

When a negative decision (NO) is obtained in step S2, the control flow goes to step S3 corresponding to the switching control portion 50, to determine whether the transmission mechanism 10 is placed in the step-variable shifting state. This determination in step S3 is made on the basis of the detected vehicle speed V and the output torque $T_{out}$ of the automatic transmission portion 20 and according to the switching boundary line map of FIG. 6, for example. When an affirmative decision (YES) is obtained in step S3, the control flow goes to step S4 corresponding to the engine-stop-resonance determining portion 86, to determine whether a resonance of the transmission mechanism 10 (drive system) which causes a vibration of the vehicle having a level higher than the upper limit is expected to take place. For instance, this determination in step S4 is made by determining whether the engine speed $N_E$ is lowered through the predetermined resonance speed range in the process of stopping of the engine 8. When an affirmative decision (YES) is obtained in step S4, the control flow goes to step S5 corresponding to the engine-stop switching control portion 50, to switch the continuously-variable transmission portion 11 to the continuously-variable shifting state by releasing the switching clutch C0 or brake B0, so that the engine speed $N_E$ can be rapidly lowered by lowering the speed $N_{M1}$ of the first electric motor M1, to zero through the predetermined resonance speed range in which the vehicle vibration the level of which is higher than the upper limit would otherwise be expected to occur due to the resonance of the transmission mechanism 10 upon stopping of the engine 8. In the example shown in the time chart of FIG. 12, the continuously-variable transmission portion 11 is switched to the continuously-variable shifting state, at a point of time t2 indicated in the time chart.

When an affirmative decision (YES) is obtained in step S2, or when a negative decision (NO) is obtained in step S3 or step S4, or after the continuously-variable transmission portion 11 is switched to the continuously-variable shifting state in step S5, the control flow goes to step S6 corresponding to the engine-stop control portion 84, to command the hybrid control portion 52 to control the first electric motor M1 so as to lower the engine speed $N_E$ at a high rate through the resonance speed range, for thereby reducing a possibility of occurrence of the resonance of the transmission mechanism 10 which causes the vehicle vibration level exceeding the upper limit. In response to this command from the engine-stop control portion 84, the hybrid control portion 52 switches the first electric motor M1 from its free state to the driving state, for lowering its speed NM1 to thereby lower the engine speed $N_E$ to zero at a high rate through the predetermined resonance speed range. In the example of FIG. 12, the engine speed $N_E$ is lowered for a length of time between points of time t2 and t4.

The control device according to the present embodiment of this invention is arranged to control the transmission mechanism 10 including the continuously-variable transmission portion 11 switchable between the continuously-variable and step-variable shifting states, such that upon stopping of the engine 8, the switching clutch C0 or brake B0 is released by the switching control portion 50, so that the continuously-variable transmission portion 11 is placed in the freely rotatable state in which the engine speed $N_E$ is not influenced by the rotating speed of the power transmitting member 18. Accordingly, the engine speed $N_E$ can be controlled (i.e., lowered) by controlling the first electric motor M1, upon stopping of the engine 8, whereby the engine 8 can be stopped without an undesirable resonance phenomenon of the transmission mechanism 10 in the process of lowering of the engine speed $N_E$ to zero.

Described more specifically, the engine-stop control portion 84 commands the hybrid control portion 52 to control the first electric motor M1 such that the engine speed $N_E$ is lowered rapidly through the predetermined resonance speed range in which the resonance of the transmission mechanism 11 causing the vehicle vibration whose level is higher than the upper limit would otherwise be expected to take place in the process of lowering of the engine speed $N_E$ to zero when the engine 8 is stopped or turned off by stopping the fuel supply to the engine 8. Accordingly, the present arrangement is effective to reduce a possibility of occurrence of the resonance which causes the vehicle vibration level higher than the upper limit, and to reduce a possibility of occurrence of the so-called "undershoot" phenomenon of the engine speed $N_E$, namely, reverse rotation of the engine 8 following zeroing of the engine speed $N_E$ upon stopping of the engine 8.

Figures 13, 14:
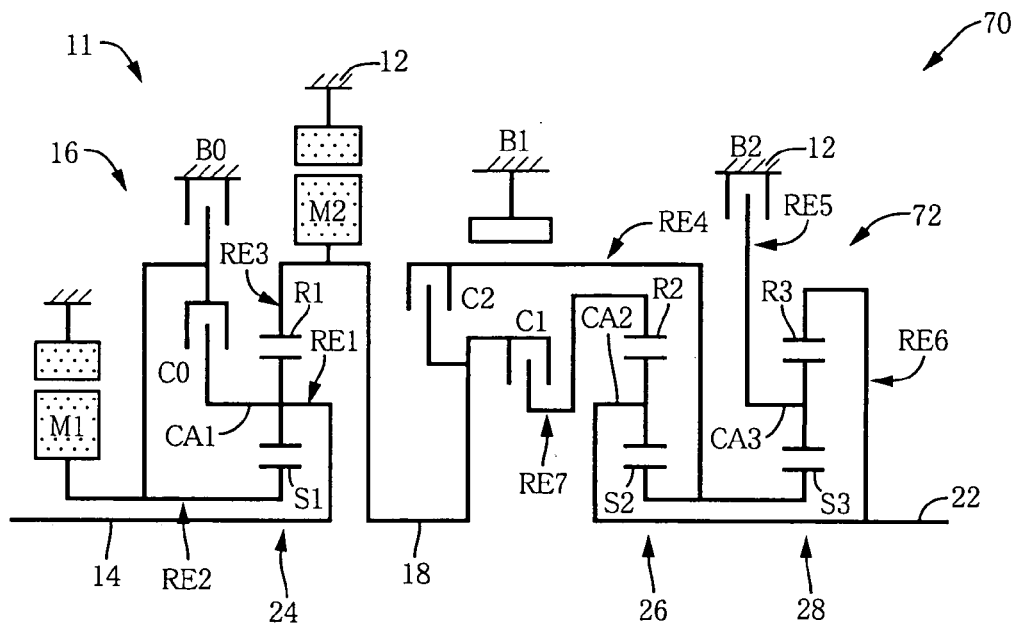
FIG. 13 is a schematic view corresponding to that of FIG. 1, showing another example of an arrangement of a transmission mechanism of a hybrid vehicle drive system, which is controlled by a control device according to the present invention.
FIG. 14 is a table corresponding to that of FIG. 2, indicating shifting actions of the transmission mechanism of FIG. 13.
Figure 15:
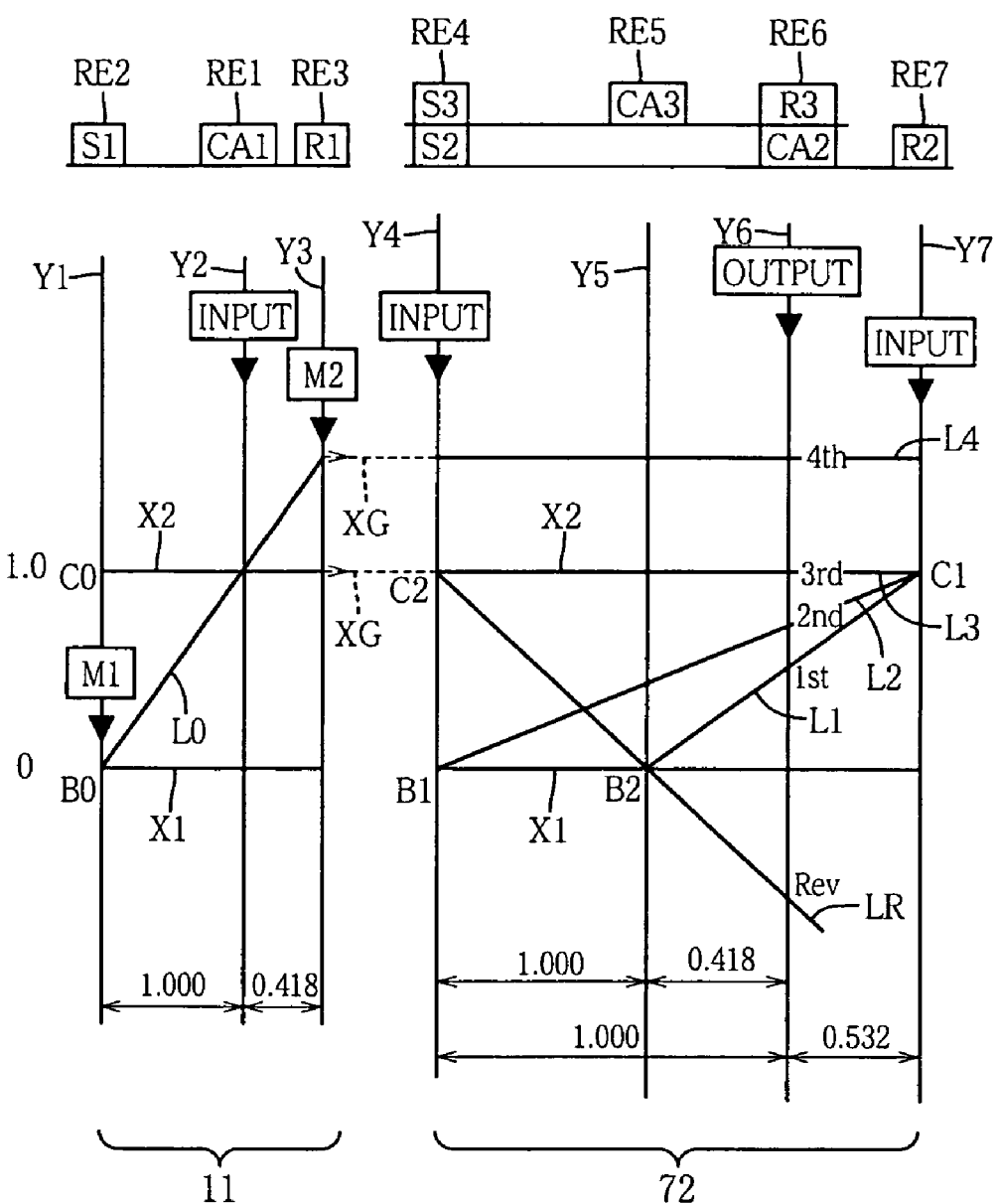
FIG. 15 is a collinear chart corresponding to that of FIG. 3, indicating relative rotating speeds of the rotary elements of the transmission mechanism of FIG. 15 in the different gear positions.

Referring to the schematic view of FIG. 13, there is shown an arrangement of a transmission mechanism 70 of a vehicular drive system, which is controllable by the control device according to the present invention. Although the transmission mechanism 70 is different from the transmission mechanism 10 which has been described by reference to FIGS. 1-12, the transmission mechanism 70 is controlled by an electronic control device which is substantially identical with the electronic control unit 40 described above. FIG. 14 is a table indicating gear positions of the transmission mechanism 70, and different combinations of engaged states of the hydraulically operated frictional coupling devices for respectively establishing those gear positions, while FIG. 15 is a collinear chart for explaining a shifting operation of the transmission mechanism 70.

The transmission mechanism 70 includes the continuously-variable transmission portion 11 having the first electric motor M1, power distributing mechanism 16 and second electric motor M2, as in the first embodiment. The transmission mechanism 70 further includes an automatic transmission portion 72 having three forward drive positions. The automatic transmission portion 72 is disposed between the continuously-variable transmission portion 11 and the output shaft 22 and is connected in series to the continuously-variable transmission portion 11 and output shaft 22, through the power transmitting member 18. The power distributing mechanism 16 includes the first planetary gear set 24 of single-pinion type having a gear ratio ρ1 of about 0.418, for example, and the switching clutch C0 and the switching brake B0, as in the first embodiment. The automatic transmission portion 72 includes a single-pinion type second planetary gear set 26 having a gear ratio ρ2 of about 0.532, for example, and a single-pinion type third planetary gear set 28 having a gear ratio ρ3 of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the transmission casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the transmission casing 12 through the second brake B2.

Figure 16:
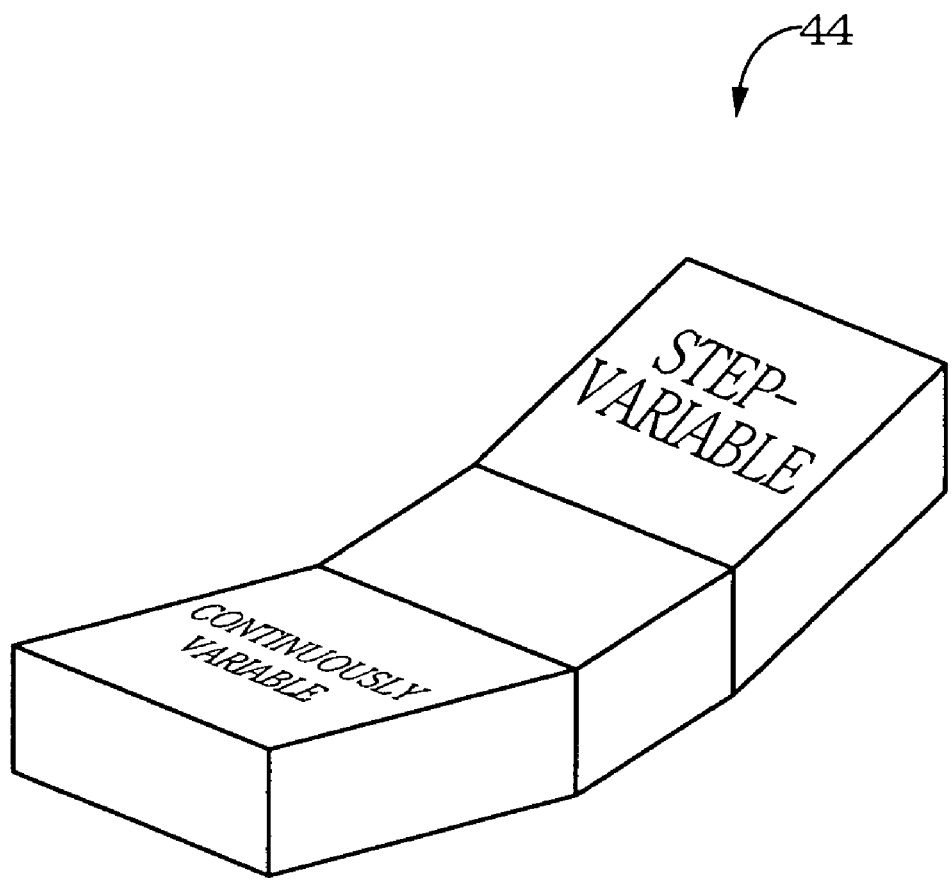
FIG. 16 is a perspective view showing a manually operable shifting-state selecting device in the form of a seesaw switch functioning as a step-variable shifting switch and a continuously-variable shifting switch, the seesaw switching being provided in another embodiment of this invention and operated by an operator of the hybrid vehicle to manually place the transmission mechanism in one of the step-variable and continuously-variable shifting states.

In the transmission mechanism 70 constructed as described above, one of a first gear position (first speed position) through a fourth gear position (fourth speed position), a reverse gear position (rear-drive position) and a neutral position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 16. Those gear positions have respective speed ratios γ (input shaft speed $N_{IN}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as a continuously variable transmission described above. In the present transmission mechanism 70, therefore, a step-variable transmission is constituted by the automatic transmission portion 20, and the continuously-variable transmission portion 11 which is placed in the fixed-speed-ratio shifting state by engagement of the switching clutch C0 or switching brake B0. Further, a continuously variable transmission is constituted by the automatic transmission portion 20, and the continuously-variable transmission portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio γ1 of about 2.804, for example, is established by engaging actions of the switching clutch C0, first clutch C1 and second brake B2, and the second gear position having the speed ratio γ2 of about 1.531, for example, which is lower than the speed ratio γ1, is established by engaging actions of the switching clutch C0, first clutch C1 and first brake B1, as indicated in FIG. 14. Further, the third gear position having the speed ratio γ3 of about 1.000, for example, which is lower than the speed ratio γ2, is established by engaging actions of the switching clutch C0, first clutch C1 and second clutch C2, and the fourth gear position having the speed ratio γ4 of about 0.705, for example, which is lower than the speed ratio γ3, is established by engaging actions of the first clutch C1, second clutch C2, and switching brake B0. Further, the reverse gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 are both released, so that the continuously-variable transmission portion 11 functions as the continuously variable transmission, while the automatic transmission portion 72 connected in series to the continuously-variable transmission portion 11 functions as the step-variable transmission, whereby the speed of the rotary motion transmitted to the automatic transmission portion 72 placed in one of the first through third gear positions, namely, the rotating speed of the power transmitting member 18 is continuously changed, so that the speed ratio of the transmission mechanism 10 when the automatic transmission portion 72 is placed in one of those gear positions is continuously variable over a predetermined range. Accordingly, the speed ratio of the automatic transmission portion 72 is continuously variable across the adjacent gear positions, whereby the overall speed ratio γT of the transmission mechanism 70 is continuously variable.

The collinear chart of FIG. 15 indicates, by straight lines, a relationship among the rotating speeds of the rotary elements in each of the gear positions of the transmission mechanism 70, which is constituted by the continuously-variable transmission portion 11 functioning as the continuously-variable shifting portion or first shifting portion, and the automatic transmission portion 72 functioning as the step-variable shifting portion or second shifting portion. The collinear chart of FIG. 15 indicates the rotating speeds of the individual elements of the continuously-variable transmission portion 11 when the switching clutch C0 and brake B0 are both released, and the rotating speeds of those elements when the switching clutch C0 or brake B0 is engaged, as in the preceding embodiments In FIG. 15, four vertical lines Y4, Y5, Y6 and Y7 correspondingly to the automatic transmission portion 72 respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the automatic transmission portion 72, the fourth rotary element RE4 is selectively connected to the power transmitting member 18 through the second clutch C2, and is selectively fixed to the transmission casing 12 through the first brake B1, and the fifth rotary element RE5 is selectively fixed to the transmission casing 12 through the second brake B2. The sixth rotary element RE6 is fixed to the output shaft 22 of the automatic transmission portion 72, and the seventh rotary element RE7 is selectively connected to the power transmitting member 18 through the first clutch C1.

When the first clutch C1 and the second brake B2 are engaged, the automatic transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element RE5 (CA3) and the horizontal line X1. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed $N_E$, with the drive force received from the continuously-variable transmission portion 11. When the switching clutch B0 is engaged in place of the switching clutch C0, the sixth rotary element REG is rotated at a speed higher than the engine speed $N_E$, with the drive force received from the continuously-variable transmission portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 is also constituted by the continuously-variable transmission portion 11 functioning as the continuously-variable shifting portion or first shifting portion, and the automatic transmission portion 72 functioning as the step-variable shifting portion or second shifting portion, so that the present transmission mechanism 70 has advantages similar to those of the first embodiment.

FIG. 16 shows a seesaw switch 44 functioning as a shifting-state selecting device manually operable to select the differential state or non-differential state of the power distributing mechanism 16, that is, to select the continuously-variable shifting state or step-variable shifting state of the transmission mechanism 10. The seesaw switch 44 has a first portion labeled "STEP-VARIABLE", and a second potion labeled "CONTINUOUSLY-VARIABLE", as shown in FIG. 16, and is placed in the step-variable shifting position by depressing the seesaw switch 44 at its first portion, and in the continuously-variable shifting position by depressing it at its second portion.

In the preceding embodiment, the shifting state of the transmission mechanism 10, 70 is automatically switched on the basis of the detected vehicle condition and according to the switching boundary line map of FIG. 6 or the shifting-region switching map of FIG. 7. However, the shifting state of the transmission mechanism 10, 70 may be manually switched by a manual operation of the seesaw switch 44. Namely, the switching control portion 50 may be arranged to selectively place the transmission mechanism 10, 10 in the continuously-variable shifting state or the step-variable shifting state, depending upon whether the seesaw switch 44 is placed in its continuously-variable shifting position or step-variable shifting position. For instance, the user of the vehicle manually operates the seesaw switch 44 to place the transmission mechanism 10, 70 in the continuously-variable shifting state when the user likes the transmission mechanism 10, 70 to operate as a continuously variable transmission or wants to improve the fuel economy of the engine, or alternatively in the step-variable shifting state when the user likes a change of the engine speed as a result of a shifting action of the automatic transmission portion 20 operating as a step-variable transmission. The seesaw switch 44 may have a neutral position in addition to the continuously-variable shifting position and the step-variable shifting position. In this case, the seesaw switch 44 may be placed in its neutral position when the user has not selected the desired shifting state or likes the transmission mechanism 10, 70 to be automatically placed in one of the continuously-variable and step-variable shifting states.

When the transmission mechanism 10 is placed in the step-variable shifting state selected by the seesaw switch 44, while it is determined by the engine-stopping-condition determining portion 82 that the predetermined engine-stopping condition is satisfied and while it is determined by the shift-position determining portion 80 that the shift lever 48 is placed in one of the driving positions D, M, that is, when the affirmative decision (YES) is obtained in step S3 of the flow chart of FIG. 11, the continuously-variable transmission portion 11 is switched in step S5 by the switching control portion 50 to the step-variable shifting state by releasing the switching clutch C0 or brake B0, if the resonance of the transmission mechanism 10 which causes the vehicle vibration level higher than the upper limit is expected to take place, that is, when the affirmative decision (YES) is obtained in step S4.

While the preferred embodiments of the present invention have been described above in detail by reference to the accompanying drawings, it is to be understood that the present invention may be otherwise embodied.

In the engine-stop control routine illustrated in the flow chart of FIG. 11, the determination in step S3 as to whether the transmission mechanism 10 is placed in the step-variable shifting state is made on the basis of the detected vehicle condition represented by the vehicle speed V and output torque $T_{OUT}$ of the automatic transmission portion 20 and according to the switching boundary line map of FIG. 6. However, this determination in step S3 may be made on the basis of the output signal of the seesaw switch 44, as described above with respect to this seesaw switch 44.

In the illustrated embodiments, the transmission mechanism 10, 70 is placed selectively in one of the continuously-variable and step-variable shifting states, when the continuously-variable transmission portion 11 (power distributing portion 16) is placed selectively in its differential state in which the continuously-variable transmission portion 11 is operable as the electrically controlled continuously variable transmission, and in its non-differential state in which the continuously-variable transmission portion 11 is not operable as the electrically controlled continuously variable transmission. However, the transmission mechanism 10, 70 may function as the step-variable transmission while the speed ratio of the continuously-variable transmission portion 11 is variable in steps rather than continuously, while this transmission portion 11 remains in the differential state. In other words, the differential and non-differential states of the continuously-variable transmission portion 11 need not respectively correspond to the continuously-variable and step-variable shifting states of the transmission mechanism 10, 70, and the continuously-variable transmission portion 11 need not be switchable between the continuously-variable and step-variable shifting states. The principle of the present invention is applicable to any transmission mechanism (its continuously-variable transmission portion 11 or power distributing mechanism 16) which is switchable between the differential state and the non-differential state.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18, respectively, through gears or belts.

Although the power distributing mechanism 16 in the illustrated embodiments is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

While the switching clutch C0 is engaged to establish the neutral position N in the transmission mechanism 10, 70 in the illustrated embodiments, the switching clutch C0 need not be engaged to establish the neutral position.

The hydraulically operated frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

In the illustrated embodiments, the second electric motor M2 is fixed to the power transmitting member 18. However, the second electric motor M2 may be fixed to the output shaft 22 or to a rotary member of the automatic transmission portion 20, 72.

In the transmission mechanisms 10, 70 described above, the power transmitting path is switched between the power-transmitting state and the power-cut-off state, by the frictional coupling devices in the form of the first and second clutches C1, C2 which are disposed between the automatic transmission portion 20, 72 and the continuously-variable transmission portion 11. However, these two clutches C1, C2 are not essential and may be replaced by at least one coupling device which is arranged to place the power transmitting path selectively in one of the power-transmitting state and the power-cut-off state, and which may be connected to the output shaft 22 or one of the rotary members of the automatic transmission portion 20, 72. The coupling device or devices need not constitute a part of the automatic transmission portion 20, 72, and may be provided separately from the automatic transmission portion 20, 72.

In the illustrated embodiments, the automatic transmission portion 20, 72 is disposed in the power transmitting path between the drive wheels 38, and the power transmitting member 18 which is the output member of the continuously-variable transmission portion 11 or power distributing mechanism 16. However, the automatic transmission portion 20, 72 may be replaced by any other type of power transmitting device such as a continuously variable transmission (CVT), which is a kind of an automatic transmission. Where the continuously variable transmission (CVT) is provided, the transmission mechanism as a whole is placed in the step-variable shifting state when the power distributing mechanism 16 is placed in the fixed-speed-ratio shifting state. The fixed-speed-ratio shifting state is defined as a state in which power is transmitted primarily through a mechanical power transmitting path, without power transmission through an electric path. The continuously variable transmission may be arranged to establish a plurality of predetermined fixed speed ratios corresponding to those of the gear positions of the automatic transmission portion 20, 72, under the control of a step-variable shifting control portion which stores data indicative of the predetermined speed ratios. It is also noted that the principle of the present invention is applicable to a vehicular drive system not including the automatic transmission portion 20, 72. The principle of the present invention is applicable to a drive system not including the automatic transmission portion 20, 72. Where the drive system uses a continuously variable transmission (CVT) in place of the automatic transmission portion 20, 72 or does not include the automatic transmission portion 20, 73, coupling devices are provided in a power transmitting path between the power transmitting member 18 and the drive wheels 38, so that the power transmitting path is selectively placed in the power-transmitting state and the power-cut-off state by selectively engaging and releasing the coupling devices.

While the automatic transmission portion 20, 72 is connected in series to the continuously-variable transmission portion 11 through the power transmitting member 18 in the illustrated embodiments, the automatic transmission portion 20, 72 may be mounted on and disposed coaxially with a counter shaft which is parallel to the input shaft 14. In this case, the continuously-variable transmission portion 11 and the automatic transmission portion 20, 72 are operatively connected to each other through a suitable power transmitting device or a set of two power transmitting members such as a pair of counter gears, and a combination of a sprocket wheel and a chain.

The power distributing mechanism 16 provided as a differential mechanism in the illustrated embodiments may be replaced by a differential gear device including a pinion rotated by the engine 8, and a pair of bevel gears which are respectively operatively connected to the first and second electric motors M1, M2.

Although the power distributing mechanism 16 is constituted by one planetary gear set in the illustrated embodiments, the power distributing mechanism 16 may be constituted by two or more planetary gear sets and arranged to be operable as a transmission having three or more gear positions when placed in its non-differential state (fixed-speed-ratio shifting state).

The illustrated vehicular drive systems use the manually operable shifting device 46 provided with the shift lever 48 manually operable to select one of a plurality of operating positions. However, the shift lever 48 may be replaced by pushbutton switches, a slide-type or any other type of switch manually operable to select a desired one of the gear positions. Although the shift lever 48 has the manual forward-drive position M for selecting the number of the forward-drive gear positions available for automatic shifting of the automatic transmission portion 20, 72, the shift lever 48 placed in the manual forward-drive position M may be used to manually shift up or down the automatic transmission portion 20, 72, within the range from the first gear position through the fourth gear position, by operating the shift lever 48 from the position M to the shift-up position "+" or shift-down position "−".

While the switch 44 is of a seesaw type switch in the illustrated embodiments, the seesaw switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The seesaw switch 44 may or may not have a neutral position. Where the seesaw switch 44 does not have the neutral position, an additional switch may be provided to enable and disable the seesaw switch 44. The function of this additional switch corresponds to the neutral position of the seesaw switch 44.

It is to be understood that other changes and modifications may be made in the present invention, which may occur to those skilled in the art, in the light of the foregoing teachings.

What is claimed is:

1. A control device for a vehicular drive system including (a) a differential mechanism operable to distribute an output of an engine to a first electric motor and a power transmitting member, (b) a second electric motor operable to apply power to a drive wheel, and (c) a differential-state switching device operable to place said differential mechanism selectively in one of a differential state in which said differential mechanism is operable to perform a differential function and a locked state in which said differential mechanism is not operable to perform the differential function, said control device comprising:

an engine-stop switching control portion operable to control said differential-state switching device to place said differential mechanism in said differential state, when said engine is stopped.

2. The control device according to claim 1, wherein said vehicular drive system comprises a continuously-variable transmission portion including said differential mechanism, said second electric motor and said differential-state switching device, and further comprises an automatic transmission portion which is disposed in a power transmitting path between the power transmitting member and the drive wheel and which functions as an automatic transmission, and wherein said differential-state switching device is operable to switch said differential mechanism between said differential and locked state, for placing said continuously-variable transmission portion selectively in one of a continuously-variable shifting state in which said continuously-variable transmission portion is operable as an electrically controlled continuously variable transmission, and a step-variable shifting state in which said continuously-variable transmission portion is not operable as the electrically controlled continuously variable transmission.

3. The control device according to claim 1, wherein said engine-stop switching control portion is operable to place said differential-state switching device in a released state to place said differential mechanism in said differential state, when said engine is stopped.

4. The control device according to claim 1, further comprising an engine-stop control portion operable to control a rate of lowering of a speed of said engine upon stopping of said engine, by controlling said first electric motor while said differential mechanism is placed in said differential state.

5. The control device according to claim 4, wherein said engine-stop control portion is operable to lower a speed of said first electric motor for rapidly lowering the speed of said engine to zero through a predetermined resonance speed range in which a resonance phenomenon of the vehicular drive system that causes a vibration of the vehicle a level of which is higher than an upper limit would otherwise be expected to take place.

6. The control device according to claim 1, wherein said differential-state switching device includes a coupling device operable to place said power transmitting path selectively in one of a power-transmitting state and a power-cut-off state, and a shifting device manually operable to a driving position in which said power transmitting path is placed in said power-transmitting state, and a non-driving state in which said power transmitting path is placed in said power-cut-off state, and wherein said engine-stop control portion is operable to place said differential mechanism in said differential state when said shifting device is placed in said driving state.

7. The control device according to claim 1, wherein said differential mechanism includes a first element fixed to said engine, a second element fixed to said first electric motor, and a third element fixed to said power distributing member, and said differential-state switching device is operable to permit said first, second and third elements to be rotated relative to each other, for thereby placing said differential mechanism in said differential state, and to connect said first, second and third elements for rotation as a unit or to hold said second element stationary, for thereby placing said differential mechanism in said locked state.

8. The control device according to claim 7, wherein said differential-state switching device includes a clutch operable to connect at least two of said first, second and third elements to each other for rotation of said first, second and third elements as a unit, and/or a brake operable to fix said second element to a stationary member for holding said second element stationary.

9. The control device according to claim 8, wherein said differential-state switching device includes both of said clutch and said brake, and is operable to release said clutch and said brake for thereby placing said differential mechanism in said differential state in which said first, second and third elements are rotatable relative to each other, and to engage said clutch and release said brake for thereby enabling said differential mechanism to function as a transmission having a speed ratio of 1, or engage said brake and release said clutch for thereby enabling said differential mechanism to function as a speed-increasing transmission having a speed ratio lower than 1.

10. The control device according to claim 7, wherein said differential mechanism is a planetary gear set, and said first, second and third elements are respective a carrier, a sun gear and a ring gear of said planetary gear set.

11. The control device according to claim 10, wherein said planetary gear set is of a single-pinion type.

12. The control device according to claim 1, wherein said vehicular drive system further includes an automatic transmission portion disposed between said power transmitting member and said drive wheel, and has an overall speed ratio which is determined by a speed ratio of said differential mechanism and a speed ratio of said automatic transmission portion.

13. The control device according to claim 12, wherein said automatic transmission portion is a step-variable automatic transmission.

* * * * *

UNITED STATES PATENT AND TRADEMARK OFFICE
CERTIFICATE OF CORRECTION

PATENT NO. : 7,426,972 B2
APPLICATION NO. : 11/172988
DATED : September 23, 2008
INVENTOR(S) : Atsushi Tabata et al.

It is certified that error appears in the above-identified patent and that said Letters Patent is hereby corrected as shown below:

| Column | Line | |
|---|---|---|
| 1 | 47 | After "both" delete "of". |
| 2 | 20 | Change "takes place" to --take place--. |
| 8 | 52 | After "sun gear" delete ".". |
| 13 | 46 | Change "speed NE" to --speed $N_E$--. |
| 14 | 38 | Change "at, a" to --at a--. |
| 20 | 47 | After "line" insert --map--. |
| 22 | 11 | After "above" insert --.--. |
| 22 | 45 | Change "speed NE" to --speed $N_E$--. |
| 23 | 11 | Delete "manual valve" (second occurrence). |
| 25 | 12 | Change "shit-position" to --shift-position--. |
| 26 | 27 | Change "considerable" to --considerably--. |
| 26 | 33 | Change "speed NE" to --speed $N_E$--. |
| 26 | 43 | Change "speed NE" to --speed $N_E$--. |
| 28 | 25 | After "functions" delete "to". |
| 28 | 42 | Change "sows" to --shows--. |
| 29 | 7 | After "not" delete "to". |
| 32 | 4 | Change "neural" to --neutral--. |
| 34 | 8 | Change "REG" to --RE6--. |

UNITED STATES PATENT AND TRADEMARK OFFICE
CERTIFICATE OF CORRECTION

PATENT NO. : 7,426,972 B2
APPLICATION NO. : 11/172988
DATED : September 23, 2008
INVENTOR(S) : Atsushi Tabata et al.

It is certified that error appears in the above-identified patent and that said Letters Patent is hereby corrected as shown below:

| Column | Line | |
|---|---|---|
| 40 | 12 | Change "respective" to --respectively--. |

Signed and Sealed this

Fourteenth Day of July, 2009

JOHN DOLL
*Acting Director of the United States Patent and Trademark Office*